United States Patent
Nuolf et al.

(10) Patent No.: US 11,238,223 B2
(45) Date of Patent: Feb. 1, 2022

(54) SYSTEMS AND METHODS FOR INTELLIGENTLY PREDICTING ACCURATE COMBINATIONS OF VALUES PRESENTABLE IN DATA FIELDS

(71) Applicant: Oracle International Corporation, Redwood Shores, CA (US)

(72) Inventors: Beat Nuolf, Arvagh (IE); Amir Hossein Rezaeian, San Mateo, CA (US); Terence Joseph Munday, Menlo Park, CA (US); Joseph Michael Albowicz, Redwood City, CA (US); Brian David MacDonald, Toronto (CA)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 16/570,959

(22) Filed: Sep. 13, 2019

(65) Prior Publication Data

US 2020/0125635 A1    Apr. 23, 2020

Related U.S. Application Data

(60) Provisional application No. 62/748,278, filed on Oct. 19, 2018.

(51) Int. Cl.
*G06F 40/274* (2020.01)
*G06N 20/00* (2019.01)
(Continued)

(52) U.S. Cl.
CPC ............ *G06F 40/274* (2020.01); *G06F 9/451* (2018.02); *G06F 40/174* (2020.01); *G06N 5/04* (2013.01);
(Continued)

(58) Field of Classification Search
CPC ...... G06F 40/274; G06F 9/451; G06F 40/174; G06N 20/00; G06N 5/04
See application file for complete search history.

(56) References Cited

U.S. PATENT DOCUMENTS 7,343,551 B1 * 3/2008 Bourdev ............... G06F 40/174
                                              715/224
7,865,411 B2    1/2011 Stone et al.
(Continued)

OTHER PUBLICATIONS

"Automated Invoice: Automated invoice is the solution which facilitates the automated management of the accounts payable process", Available Online at: https://www.reply.com/en/content/automated-invoice, Accessed from Internet on: Apr. 30, 2019, 4 pages.

(Continued)

*Primary Examiner* — Thu V Huynh
(74) *Attorney, Agent, or Firm* — Kilpatrick Townsend & Stockton LLP

(57) ABSTRACT

The present disclosure relates to systems and methods for providing an interface that displays a prediction of remaining code segments of a code comprised of a sequence of code segments. The remaining code segments may be automatically predicted in response to the interface receiving a user's input of at least a portion of a code segment (or a user input of other data elements that are not code segments). Predicting the remaining code segments may be performed using a trained machine-learning model that can generate output(s) predictive of remaining code segments in response to a user inputting at least one code segment of a code into an input element of the interface.

19 Claims, 13 Drawing Sheets

(51) Int. Cl.
*G06F 9/451* (2018.01)
*G06N 5/04* (2006.01)
*G06F 40/174* (2020.01)
*G06F 3/0489* (2013.01)

(52) U.S. Cl.
CPC ......... *G06N 20/00* (2019.01); *G06F 3/04892* (2013.01)

(56) References Cited

U.S. PATENT DOCUMENTS

| | | | |
|---|---|---|---|
| 9,805,306 B1* | 10/2017 | Bataller | ............... H04L 43/14 |
| 10,019,740 B2 | 7/2018 | Simantov et al. | |
| 10,176,162 B2* | 1/2019 | Wilson | ............... G06Q 10/107 |
| 2016/0171627 A1 | 6/2016 | Lyubarskiy | |
| 2017/0046622 A1* | 2/2017 | Gaither | ............... G06F 40/247 |
| 2017/0046656 A1 | 2/2017 | Bramble et al. | |
| 2017/0099240 A1* | 4/2017 | Evnine | ............... H04W 4/21 |
| 2018/0052891 A1* | 2/2018 | Shuster | ............ G06F 16/24568 |
| 2019/0065455 A1* | 2/2019 | Dua | ................ G06F 16/24578 |
| 2019/0155894 A1* | 5/2019 | Gandhi | ............... G06F 40/186 |

OTHER PUBLICATIONS

"SAP Cash Application", Available Online at: https://www.sap.com/india/products/cash-application.html, Accessed from Internet on: Apr. 30, 2019, 1 page.

"Stampli's Artificial Intelligence Assistant", Available Online at: https://www.stampli.com/stampli-artificial-intelligence-assistant/, Accessed from Internet on: Apr. 30, 2019, 1 page.

"Touchless Invoice Optimizer: A better wat topaythe bills", Genpact, Available Online at: https://www.genpact.com/downloadable-content/touchless-invoice-optimizer-a-better-way-to-pay-the-bills.pdf, Feb. 27, 2017, 4 pages.

"Xtracta", Available Online at: https://xtracta.com/, Accessed from Internet on: Apr. 30, 2019, 1 page.

ORCUTT; Bruce, "Voices Transforming AP with AI", Accounting Today, Mar. 5, 2018, Available Online at: https://www.accountingtoday.com/opinion/transforming-ap-with-ai, , 3 pages.

Sagmeister; Patrick, "Artificial Intelligence for Invoice Processing", Abacus Accounting Technologies, Available Online at: https://abacus.ac/artificial-intelligence-for-invoice-processing/, Accessed from Internet on: Feb. 25, 2019, 3 pages.

* cited by examiner

SYSTEMS AND METHODS FOR INTELLIGENTLY PREDICTING ACCURATE COMBINATIONS OF VALUES PRESENTABLE IN DATA FIELDS

CROSS-REFERENCE TO RELATED APPLICATIONS

The present application claims the priority benefit of U.S. Provisional Application No. 62/748,278, filed on Oct. 19, 2018, the disclosure of which is incorporated by reference herein in their entirety for all purposes.

TECHNICAL FIELD

The present disclosure relates to systems and methods that execute machine-learning or artificial-intelligence (AI) models to generate outs that can be evaluated to predict the remaining code segments of a code comprised of a sequence of code segments. More particularly, the present disclosure relates to systems and methods that automatically completes (e.g., fills in) values into data fields displayed on an interface in response to user input (e.g., at least a portion of a code segment inputted by a user).

BACKGROUND

Applications are often used to facilitate the recording and/or processing of documents (e.g., invoices). For example, a user may receive documents from a company listing items that the user purchased from the company. Each document may include a code (e.g., a general ledger account code) characterizing aspects of the product or service. In order for the documents to be processed, however, the user may need to input the code into an application for further processing. However, many applications of this type require the user to manually enter the code for each item listed on a document. In some cases, the code may not be listed in the document or may not be easily accessible. If the code were not included on the document, however, then the user would have to search for the correct code to input into the application. Roughly 60% of a user's working time is typically spent searching for the correct codes for the various items listed on a document. As the transactions of a company increase in number and become more complex, identifying the correct code for items has become inefficient and burdensome.

SUMMARY

Certain aspects and features of the present disclosure relate to systems and methods for providing an interface that displays a prediction of data field values in response to receiving a user's input (e.g., at least a portion of a data field value or other information). The interface may present a plurality of input elements. Each input element may be configured to receive user input (e.g., data field values typed into the input element) or to display a data field value that is predicted by a machine learning or artificial intelligence model based on the user input received at another input element. Further, each input element may represent a data field in an ordered sequence of data fields. The sequence of data fields may represent a code. The interface may cause any data field values that have been inputted by a user to be processed by the machine learning or artificial intelligence model. Processing the incomplete data field value(s) inputted by the user may result in the model generating one or more outputs. Each output may be evaluated to predict remaining data field values of the code. The remaining input elements (e.g., the input elements other than the input element that received the user input of a data field value or a portion thereof) may automatically populate the predicted data field values.

In certain embodiments, the machine learning or artificial intelligence model may be trained using a training data set. The training data set may include a plurality of documents (e.g., invoices). Each document may include at least an item (e.g., a product or service) and a code characterizing aspects of that item. As described above, the code may include multiple code segments (e.g., data field values). To illustrate and only as a non-limiting example, the code may include 30 code segments, and each code segment may be a 5-digit numerical value. One or more machine learning or artificial intelligence algorithms may be executed on the training data set to train the model. For example, executing the machine learning or artificial intelligence algorithms on the training data set may result in the detection of relationships or dependencies between various code segments. Continuing with the non-limiting example above, executing the machine learning or artificial intelligence algorithms on the training data set may result in the detection of a relationship between a particular 5-digit numerical value ("12345") and two other 5-digit numerical values ("22222" and "33333"), in that whenever a code includes a code segment of the particular 5-digit numerical value ("12345") that code segment is always followed by one of the two other 5-digit numerical values ("22222" or "33333"). Thus, the dependencies of the values "12345" to "22222" and of "12345" to "33333" may be stored or represented in the model.

Further, certain aspects and features of the present disclosure relate to systems and methods that evaluate characteristics of documents (e.g., item provider information, item description, item value, etc.) and/or any information provided by a user to predict the correct combination of code segments included in a particular document. In some implementations, the predicted combination of code segments can be automatically populated in corresponding data fields of the interface in an autocomplete or type-ahead manner. In some implementations, the interface can display one or more alternative recommendations of values for the combination of code segments of a particular line item included in the document.

In some implementations, a code can include a combination of any number of code segments (e.g., seven different segments of values that together in a particular order make up a particular code included in a document). Further, each code segment may include any number of values (e.g., alphanumeric values). The application, when running on a computing device, can cause an interface to be displayed. The interface can be configured to present a plurality of data fields, such that the plurality of data fields represents the code. Each data field of the plurality of data fields can be configured to receive input from a user. Further, each code segment of the code can represent a characteristic of a document (e.g., a segment of an account code or a description of a line item).

To illustrate and only as a non-limiting example, the plurality of data fields presented on the interface may include five data fields. Each data field of the five data fields may be configured to receive a value as input from the user. Four data fields represent (in the order in which they are presented on the interface) a complete general ledger account code, and one data field is configured to receive input corresponding to a description of an item listed on an invoice. The user may need to determine the complete code for a line item in an invoice. In one scenario, the user may not know any portion of the code, but the user needs to search for and enter the complete code into the application. Advantageously, according to certain embodiments, when the user does not know the code, the user can select the data field corresponding to the description of the item associated with the line item. Then, the user can enter a description of the item into that data field. When the user tabs to the next data field, the input received from the user can be automatically transmitted to the machine learning and artificial intelligence model. The model can evaluate the input (e.g., the text describing the item) and predict which four code segments corresponds to the input (and potentially one or more alternative recommendations of the four code segments). The predicted four code segments can be transmitted to the interface and displayed in the four data fields in the correct order that represents the code that corresponds to the description.

The model can run one or more artificial intelligence and/or machine-learning techniques, such as a supervised learning technique like an ensemble of multi-label classifiers, on previously-processed documents to identify which codes have corresponded to the inputted description or a similar description in the past. Advantageously, the model provides a solution to a multi-class and multi-label problem. Further, a REST (Representational State Transfer) service may be used to receive data from the interface, process the data at the model, and transmit the predicted code segments (that complete the code) back to the interface for presentation to the user.

In another scenario, the user may know only a portion of the correct code, but not the entire code. The user begins typing in the first three characters of a five-digit code segment. As the user types, the REST service can be used to process the portion of the code. When the model receives the first three characters of the five-digit code segment, the model can predict all potential code segments that include the inputted three characters. In this example, there are three options of code segments based on the inputted three characters. The REST service can transmit the predicted three options to the interface, such that the interface shows the three options in or around the presented data fields. The three options can be presented in real-time automatically as the user types in the first three characters of the five-digit code segment. The user either types in the fourth character in the data field or selects one of the three options for the fourth character. If the fourth character entered by the user is different from the three options for the fourth character, then a feedback signal will be transmitted to the model to improve the accuracy of the code prediction and a new prediction can be generated based on the four characters entered by the user. Once the code segment is determined, the model can predict the remaining three code segments. For instance, the model can run one or more artificial intelligence and/or machine-learning techniques on a training data set including all previously paid invoices, and as a result, identify that the code segment entered by the user is highly correlated to three other code segments. The model can be trained to predict that the three other code segments correspond to the remaining three code segments in a particular order. Accordingly, the combination of the code segments can be accurately predicted to determine the complete code. In another scenario, the user may know the complete account code and may type the entire code into the input elements displayed on the interface.

In yet another scenario, the model may generate a prediction of a code segment based on user input of another code segment, however, the generated prediction may be associated with an uncertainty level (e.g., a confidence score). In examples where the prediction by the model has a high uncertainty (e.g., a confidence score below a threshold), then that predicted code segment may not be sent back to the interface for populating in the respective data field. For example, for infrequently used code segment values, or when the user initially begins data entry and the model has not had sufficient training examples, certain predicted code segments would not be populated in the interface due to the low accuracy of the predicted segment values. In the cases where the confidence score is low for a given predicted code segment, or the training data set for the model is not sufficiently large, the model does not generate a prediction for that code segment, or if a prediction is generated for that code segment, that prediction is not transmitted back to the interface using the REST service. In another example, the predicted code segment may be displayed on the interface, along with a notification or alert indicating that the accuracy of the predicted code segment is low. Accordingly, the user will need to manually enter that particular code segment for which the confidence score is below a threshold. In some implementations, the model's predicted code segment values may be associated with a confidence score that represent how confident the model is as to the accuracy of that particular prediction. As a non-limiting example, the model may predict nine out of ten code segments in a code, however, the confidence score may be below a threshold for the last remaining code segment, and thus, no prediction will be provided for that last code segment. The user will need to manually enter the last remaining code segment.

In certain embodiments, a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer-implemented method, including: collecting document data stored at one or more servers, the document data representing one or more documents that characterize resources exchanged at previous times, each document of the one or more documents including one or more data items representing a resource exchanged, each data item of the one or more data items corresponding to a code included of an ordered sequence of a plurality of code segments, and each code segment of the ordered sequence characterizing an aspect of the corresponding resource exchanged; training a model using the collected document data, the model having been trained by executing one or more machine-learning algorithms that train the model to generate an output, the output being used to predict remaining code segments of a code in response to receiving at least one code segment of the code, and the model having been trained based, at least in part, on the plurality of code segments included in the one or more documents; displaying an interface presenting a plurality of input elements, each input element of the plurality of input elements being configured to individually receive a value representing a code segment or to display a value representing a predicted code segment for selection by a user; receiving an input at an input element of the plurality of input elements displayed on the interface, the input corresponding to a particular code segment of a particular code, and the particular code corresponding to a particular resource exchanged included in a particular document; processing the input using the trained model. The computer-implemented method also includes in response to processing the input using the trained model, generating one or more outputs of the model, each output of the one or more outputs representing a prediction of one or more remaining code segments of the particular code, and each remaining code segment of the one or more remaining code segments corresponding to a remaining portion of the particular code other than the particular code segment, such that the particular code segment and the one or more remaining code segments represent the particular code; and displaying the predicted one or more remaining code segments, such that each remaining code segment of the one or more remaining code segments is presented at a remaining input element of the plurality of input elements, and the remaining input element being different from the input element that received the input. Other embodiments of this aspect include corresponding computer systems, apparatus, and computer programs recorded on one or more computer storage devices, each configured to perform the actions of the methods.

Implementations may include one or more of the following features. The computer-implemented method where displaying the predicted one or more remaining code segments includes automatically presenting each remaining code segment of the one or more remaining code segments within a remaining input element of the plurality of input elements in response to receiving the input at the input element. The computer-implemented method where the predicted at least one remaining code segment is automatically displayed at the remaining input element using one or more type-ahead techniques. The computer-implemented method where training the model causes a relationship between two different code segments to be detected, the detection of the relationship indicating that the two different code segments formed at least a portion of a code included in a document of the one or more documents. The computer-implemented method where the particular code is stored at a server as a single data field, and where the particular code segment is a portion of the single data field. The computer-implemented method where the particular code is stored at a server across a plurality of data fields, where the particular code segment is one data field of the plurality of data fields, and where each remaining code segment of the one or more remaining code segments correspond to another data field of the plurality of data fields. The computer-implemented method where the generation of the one or more outputs of the model is triggered when a tab input is detected at the interface, where the tab input causes an input cursor to move from the input element of the plurality of input elements to another input element of the plurality of input elements. Implementations of the described techniques may include hardware, a method or process, or computer software on a computer-accessible medium.

Advantageously, the model can learn the precise combinations of multiple values together in one or more data fields. In certain embodiments, if users do not input any portion of the code, the model can nonetheless predict the account code based on other data, such as a description of an item. Additionally, in certain embodiments, if the user inputs a portion of the code (e.g., two code segments of five code segments that make up the code), the model can automatically predict the remaining portion of the code (e.g., the three code segments remaining in the 5 code segments of the code), based on a detected correlation that the portion of the code inputted by the user are frequently used with other code segments in a complete code.

BRIEF DESCRIPTION OF THE DRAWINGS

The specification makes reference to the following appended figures, in which use of like reference numerals in different figures is intended to illustrate like or analogous components.

DETAILED DESCRIPTION

In the following description, for the purposes of explanation, specific details are set forth in order to provide a thorough understanding of embodiments of the invention. However, it will be apparent that various embodiments may be practiced without these specific details. The figures and description are not intended to be restrictive.

Many types of computing systems and applications generate vast amounts of data pertaining or resulting from operation of that computing system or application. These vast amounts of data are frequently then stored into collected locations, such as log files/records, which can be reviewed at a later time period if there is a need to analyze the behavior or operation of the system or application.

While the below description may describe embodiments by way of illustration with respect to "log" data, processing of other types of data are further contemplated. Therefore, embodiments are not to be limited in its application only to log data. In addition, the following description may also interchangeably refer to the data being processed as "records" or "messages", without intent to limit the scope of the invention to any particular format for the data.

Figure 1A:
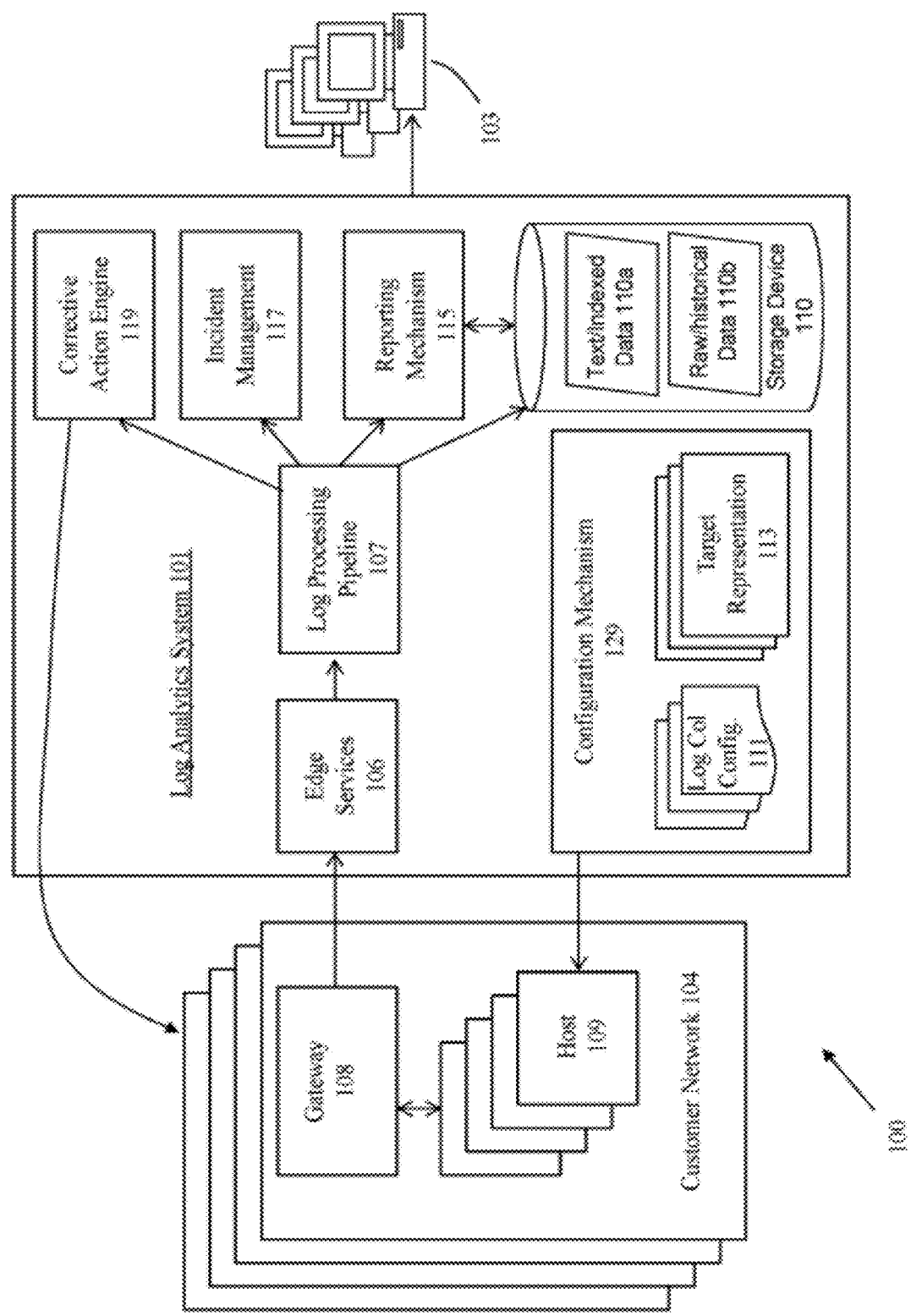
FIG. 1A illustrates an example system for configuring, collecting, and analyzing log data according to some embodiments of the present disclosure.

FIG. 1A illustrates an example system 100 for configuring, collecting, and analyzing log data according to some embodiments of the invention. System 100 includes a log analytics system 101 that in some embodiments is embodied as a cloud-based and/or SaaS-based (software as a service) architecture. This means that log analytics system 101 is capable of servicing log analytics functionality as a service on a hosted platform, such that each customer that needs the service does not need to individually install and configure the service components on the customer's own network. The log analytics system 101 is capable of providing the log analytics service to multiple separate customers, and can be scaled to service any number of customers.

Each customer network 104 may include any number of hosts 109. The hosts 109 are the computing platforms within the customer network 104 that generate log data as one or more log files. The raw log data produced within hosts 109 may originate from any log-producing source. For example, the raw log data may originate from a database management system (DBMS), database application (DB App), middleware, operating system, hardware components, or any other log-producing application, component, or system. One or more gateways 108 are provided in each customer network to communicate with the log analytics system 101.

The system 100 may include one or more users at one or more user stations 103 that use the system 100 to operate and interact with the log analytics system 101. The user station 103 comprises any type of computing station that may be used to operate or interface with the log analytics system 101 in the system 100. Examples of such user stations include, for example, workstations, personal computers, mobile devices, or remote computing terminals. The user station comprises a display device, such as a display monitor, for displaying a user interface to users at the user station. The user station also comprises one or more input devices for the user to provide operational control over the activities of the system 100, such as a mouse or keyboard to manipulate a pointing object in a graphical user interface to generate user inputs. In some embodiments, the user stations 103 may be (although not required to be) located within the customer network 104.

The log analytics system 101 comprises functionality that is accessible to users at the user stations 101, where log analytics system 101 is implemented as a set of engines, mechanisms, and/or modules (whether hardware, software, or a mixture of hardware and software) to perform configuration, collection, and analysis of log data. A user interface (UI) mechanism generates the UI to display the classification and analysis results, and to allow the user to interact with the log analytics system.

Figure 1B:
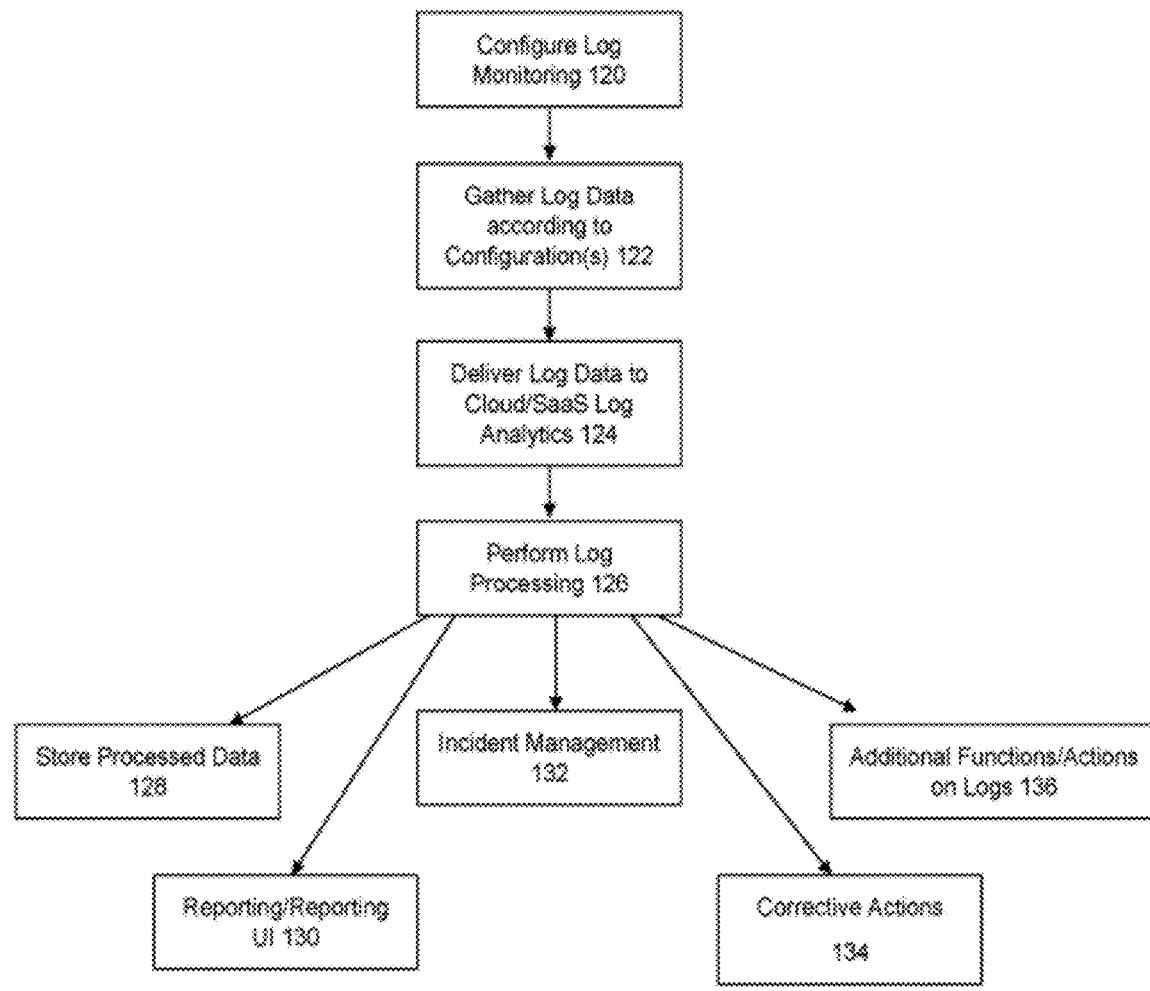
FIG. 1B illustrates a flowchart of an approach to use a system to configure, collect, and analyze log data.

FIG. 1B shows a flowchart of an approach to use system 100 to configure, collect, and analyze log data. This discussion of FIG. 1B will refer to components illustrated for the system 100 in FIG. 1A.

At 120, log monitoring is configured within the system. This may occur, for example, by a user/customer to configure the type of log monitoring/data gathering desired by the user/customer. Within system 101, a configuration mechanism 129 comprising UI controls is operable by the user to select and configure log collection configuration 111 and target representations 113 for the log collection configuration.

The log collection configuration 111 comprises the set of information (e.g., log rules, log source information, and log type information) that identify what data to collect (e.g., which log files), the location of the data to collect (e.g., directory locations), how to access the data (e.g., the format of the log and/or specific fields within the log to acquire), and/or when to collect the data (e.g., on a periodic basis). The log collection configuration 111 may include out-of-the-box rules that are included by a service provider. The log collection configuration lll may also include customer-defined/customer-customized rules.

The target representations 113 identify "targets", which are individual components within the customer environment that that contain and/or produce logs. These targets are associated with specific components/hosts in the customer environment. An example target may be a specific database application, which is associated with one or more logs and/or one or more hosts.

The next action at 122 is to capture the log data according to the user configurations. The log data may originate from any log-producing source location, such as a database management system, database application, middleware, hardware logs, operating system logs, application logs, application server logs, database server logs, and any other type of log that monitors the behavior of a system or application.

In some instances, the association between the log rules 111 and the target representations is sent to the customer network 104 for processing. An agent of the log analytics system is present on each of the hosts 109 to collect data from the appropriate logs on the hosts 109.

In some embodiments, data masking may be performed upon the captured data. The masking is performed at collection time, which protects the customer data before it leaves the customer network. For example, various types of information in the collected log data (such as user names and other personal information) may be sensitive enough to be masked before it is sent to the server. Patterns are identified for such data, which can be removed and/or changed to proxy data before it is collected for the server. This allows the data to still be used for analysis purposes, while hiding the sensitive data. Some embodiments permanently remove the sensitive data (e.g., change all such data to "***" symbols), or changed to data that is mapped so that the original data can be recovered.

At 124, the collected log data is delivered from the customer network 104 to the log analytics system 101. The multiple hosts 109 in the customer network 104 provide the collected data to a smaller number of one or more gateways 108, which then sends the log data to edge services 106 at the log analytics system 101. The edge services 106 receives the collected data one or more customer networks, perform any intake processing (e.g., applying grammar rules to transform each message into a normalized message or skeleton message that lacks components of inter-cluster message variability and assigning each transformed message to an initial cluster identified using a hash of the transformed message) and may place the data into an inbound data store for further processing by a log processing pipeline 107.

At 126, the log processing pipeline 107 performs a series of data processing and analytical operations upon the collected log data. In various instances, the processing and analytical operations can include actions performed prior to storing the data and/or by performing actions on data retrieved from a data store. For example, one or more log messages may be assigned to initial clusters at an ingest time (e.g., upon receiving the log message(s) from a source), and the log message(s) may be subsequently retrieved in response to a query to modify or supplement the initial clustering and generate statistics and/or presentations based on the clustering.

At 128, the processed data is then stored into a data storage device 110. The computer readable storage device 110 comprises any combination of hardware and software that allows for ready access to the data that is located at the computer readable storage device 110. For example, the computer readable storage device 110 could be implemented as computer memory operatively managed by an operating system. The data in the computer readable storage device 110 could also be implemented as database objects, cloud objects, and/or files in a file system. In some embodiments, the processed data is stored within both a text/indexed data store 110*a* (e.g., as a SOLR cluster) and a raw/historical data store 110*b* (e.g., as a HDFS cluster).

A SOLR cluster corresponds to an Apache™ open source local search platform. The SOLR cluster can use a search library to perform full-text indexing and searching of data stored in a HDFS cluster. The SOLR cluster can provide APIs compatible with various languages to interface the searching functions with other programs and applications. Indexing can be performed in near real-time. The cluster can operate on a set of servers to facilitate fault tolerance and availability. Indexing and search tasks can be distributed across the set of servers.

An HDFS cluster corresponds to a Hadoop Distributed File System cluster. The HDFS cluster can include many (e.g., thousands) of servers to host storage (e.g., directly attached storage) and execute tasks, such as tasks defined by user applications. The HDFS cluster can include a master/slave architecture with a single master server for managing a namespace of the cluster. A file can be divided into blocks to be stored at multiple DataNodes of the HDFS cluster. The master server can perform file operations (e.g., open, close, etc.) and determine which blocks are to be stored on which data nodes. The master server can communicate with data nodes for requests to read or write data in response to receipt of corresponding file operations.

Figure 2:
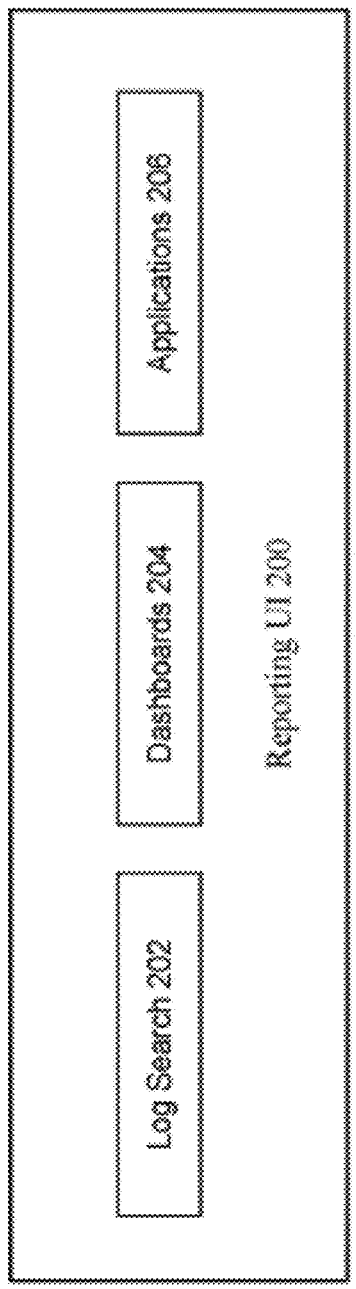
FIG. 2 illustrates an example of a reporting user interface.

At 130, reporting may be performed on the processed data using a reporting mechanism/UI 115. As illustrated in FIG. 2, the reporting UI 200 may include a log search facility 202, one or more dashboards 204, and/or any suitable applications 206 for analyzing/viewing the processed log data. Examples of such reporting components are described in more detail below.

At 132, incident management may be performed upon the processed data. One or more alert conditions can be configured within log analytics system such that upon the detection of the alert condition, an incident management mechanism 117 provides a notification to a designated set of users of the incident/alert.

At 134, a Corrective Action Engine 119 may perform any necessary actions to be taken within the customer network 104. For example, a log entry may be received that a database system is down. When such a log entry is identified, a possible automated corrective action is to attempt to bring the database system back up. The customer may create a corrective action script to address this situation. A trigger may be performed to run the script to perform the corrective action (e.g., the trigger causes an instruction to be sent to the agent on the customer network to run the script). In an alternative embodiment, the appropriate script for the situation is pushed down from the server to the customer network to be executed. In addition, at 136, any other additional functions and/or actions may be taken as appropriate based at last upon the processed data.

Figure 3A:
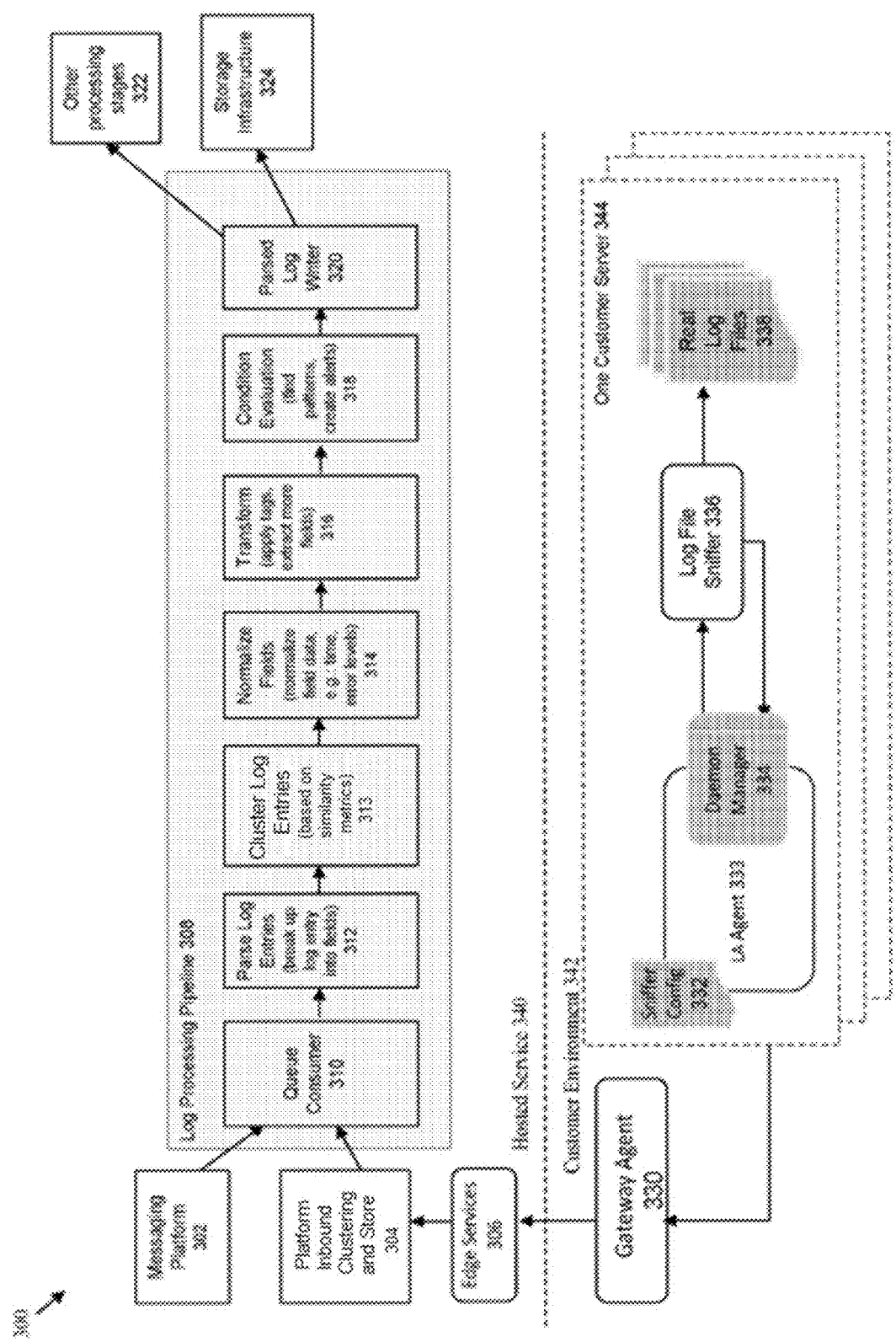
FIGS. 3A-3C are flow diagrams illustrating the internal structure of the log analytics system at a host environment.

FIG. 3A provides a more detailed illustration of the internal structure of the log analytics system at a host environment 340 and the components within the customer environment 342 that interact with the log analytics system. This architecture 300 is configured to provide a flow for log monitoring that is able to handle large amounts of log data ingest.

In the customer environment 342 within a single customer host/server 344, the LA (log analytics) agent 333 takes the log monitoring configuration data 332 (e.g., sniffer configuration or target-side configuration materials), and calls a log file 336 sniffer (also referred to herein as the "log collector") to gather log data from one or more log files 338.

A daemon manager 334 can be employed to interface with the log file sniffer 336. The log file sniffer 336 reads from one or more log files 338 on the host machine 344. The daemon manager 334 takes the log content and packages it up so that it can be handed back to the LA agent 333. It is noted that the system may include any number of different kinds of sniffers, and a log sniffer 336 is merely an example of a single type of sniffer that can be used in the system. Other types of sniffers may therefore be employed within various embodiments of the invention, e.g., sniffers to monitor registries, databases, windows event logs, etc. In addition, the log sniffer in some embodiments is configured to handle collective/compressed files, e.g., a Zip file.

The LA agent 333 sends the gathered log data to the gateway agent 330. The gateway agent 330 packages up the log data that is collected from multiple customer hosts/servers, essentially acting as an aggregator to aggregate the log content from multiple hosts. The packaged content is then sent from the gateway agent 330 to the edge services 306. The edge services 306 receive a large amount of data from multiple gateway agents 330 from any number of different customer environments 342.

Given the potentially large volume of data that may be received at the edge services 306, the data can be immediately processed to assign each log message to an initial cluster and stored into an inbound data storage device 304 (the "platform inbound clustering store"). In some instances, an initial or preliminary processing may be performed at an ingest time, which can include a time corresponding to (e.g., before, shortly or immediately after, or concurrent with) storage of the data. The initial or preliminary processing may include (for example) detecting which parts of the data are non-variable components and determining an initial cluster for each log message based on the non-variable components detected in the message. For example, a hashing technique may be applied to a value of each non-variable component to generate an identifier of the initial cluster. The log message may then be stored in association with the identifier of the initial cluster or other cluster data can be stored to indicate that the log message is associated with the initial cluster. Cluster assignments may be further refined, enhanced and/or used during subsequent processing, such as during processing that occurs during a time of subsequent resource availability and/or in response to receiving a query for data corresponding to or potentially corresponding to the associated log messages.

Thus, in some instances, a queue is managed and maintained, where queue elements corresponding to one or more log messages for which cluster assignments are to be refined, enhanced and/or used. An element may be added to the queue (for example) subsequent to an initial storing of the queue element and/or in response to receiving a query for data corresponding to or potentially corresponding to one or more associated log messages. The queue can be used for the log processing pipeline 308.

A data structure is provided to manage the items to be processed within the inbound data store. In some embodiments, a messaging platform 302 (e.g., implemented using the Kafka product) can be used to track the to-be-processed items within the queue. Within the log processing pipeline 308, a queue consumer 310 identifies the next item within the queue to be processed, which is then retrieved from the platform inbound store. The queue consumer 310 comprises any entity that is capable of processing work within the system off the queue, such as a process, thread, node, or task.

The retrieved log data undergoes a "parse" stage 312, where the log entries are parsed and broken up into specific fields or components. The "log type" configured for the log specifies how to break up the log entry into the desired fields.

At a "cluster" stage 313, log data is further analyzed to assign individual log messages to a cluster. Specifically, multiple initial clusters to which log messages were assigned during an intake process (e.g., at 304) can be assessed to determine whether some of the initial clusters are to be merged together. The assessment can include identifying one or more representative samples for each cluster and performing pair-wise quantitative comparative assessments. Cluster pairs assessed via a pair-wise comparative assessment can include clusters with log messages having same or similar number of components (or words). In some instances, each pair of clusters includes clusters associated with a number of components that are the same or different from each other by less than a threshold number (e.g., that is predefined, a default number, or identified by a user) is evaluated using the assessment. The comparative assessment may be performed iteratively and/or in a structured manner (e.g., such that pairs with a same number of components are evaluated prior to evaluating pairs with a different number of components).

The pair-wise quantitative comparative assessment can include, for example, generating a similarity metric using the representative messages and determining whether the metric exceeds a threshold metric (e.g., that is predefined, a default number of identified by a user). The similarity metric may be based on (for example) whether the representative messages include a same (or similar) number of components, number of variable (or non-variable) components, content of each of one or more non-variable components, characteristic (e.g., format, character type or length) of one or more variable components, and so on. The similarity metric may be based on generating a correlation coefficient between the inter-cluster messages or by performing a clustering technique using a larger set of messages to an extent to which representative messages of the clusters are assigned to a same cluster or share components (e.g., if a technique includes using a component analysis, such as principal component analysis or independent component analysis.

In the "normalize" stage 314, the identified fields are normalized. For example, a "time" field may be represented in any number of different ways in different logs. This time field can be normalized into a single recognizable format (e.g., UTC format). As another example, the word "error" may be represented in different ways on different systems (e.g., all upper case "ERROR", all lower case "error", first letter capitalized "Error", or abbreviation "err"). This situation may require the different word forms/types to be normalized into a single format (e.g., all lower case un-abbreviated term "error").

The "transform" stage 316 can be used to synthesize new content from the log data. As an example, "tags" can be added to the log data to provide additional information about the log entries. As another example, a tag may identify a cluster to which a log message is assigned.

A "condition evaluation" stage 318 is used to evaluate for specified conditions upon the log data. This stage can be performed to identify patterns within the log data, and to create/identify alerts conditions within the logs. Any type of notifications may be performed at this stage, including for example, emails/text messages/call sent to administrators/customers or alert to another system or mechanism. As one example, a condition may define an event that corresponds to a change in cluster assignments, such as detecting that a quantity (e.g., number or percentage) of log messages assigned to a given cluster has exceeded a threshold (e.g., that is fixe and pre-defined or defined by a user, a client or rule), such as being below a lower threshold or above an upper threshold. As another example, a condition may define an event that corresponds to a degree to which a quantity of log messages being assigned to a given threshold is changing, such as by identifying a threshold for a slope of a time series or a threshold for a difference in counts or percentages or log message assigned to the cluster between two time bins. As yet another example, a condition may define an event that corresponds to multiple cluster assignments, such as an event that indicates that a time series of each of the multiple clusters has a similar shape (e.g., by determining whether curve-fit coefficients are similar enough to be within a threshold amount, by determining whether a time of one or more peaks in time series are within a defined threshold time, determining whether a correlation coefficient between time series of the clusters exceeds a threshold, and/or determining whether a difference between a variability of a time series of each of the individual clusters and a variability of a sum of the time series exceeds a threshold value).

A log writer 320 then writes the processed log data to one or more data stores 324. In some embodiments, the processed data is stored within both a text/indexed data store (e.g., as a SOLR cluster) and a raw and/or historical data store (e.g., as a HDFS cluster). The log writer can also send the log data to another processing stage 322 and/or downstream processing engine.

Figure 3B:
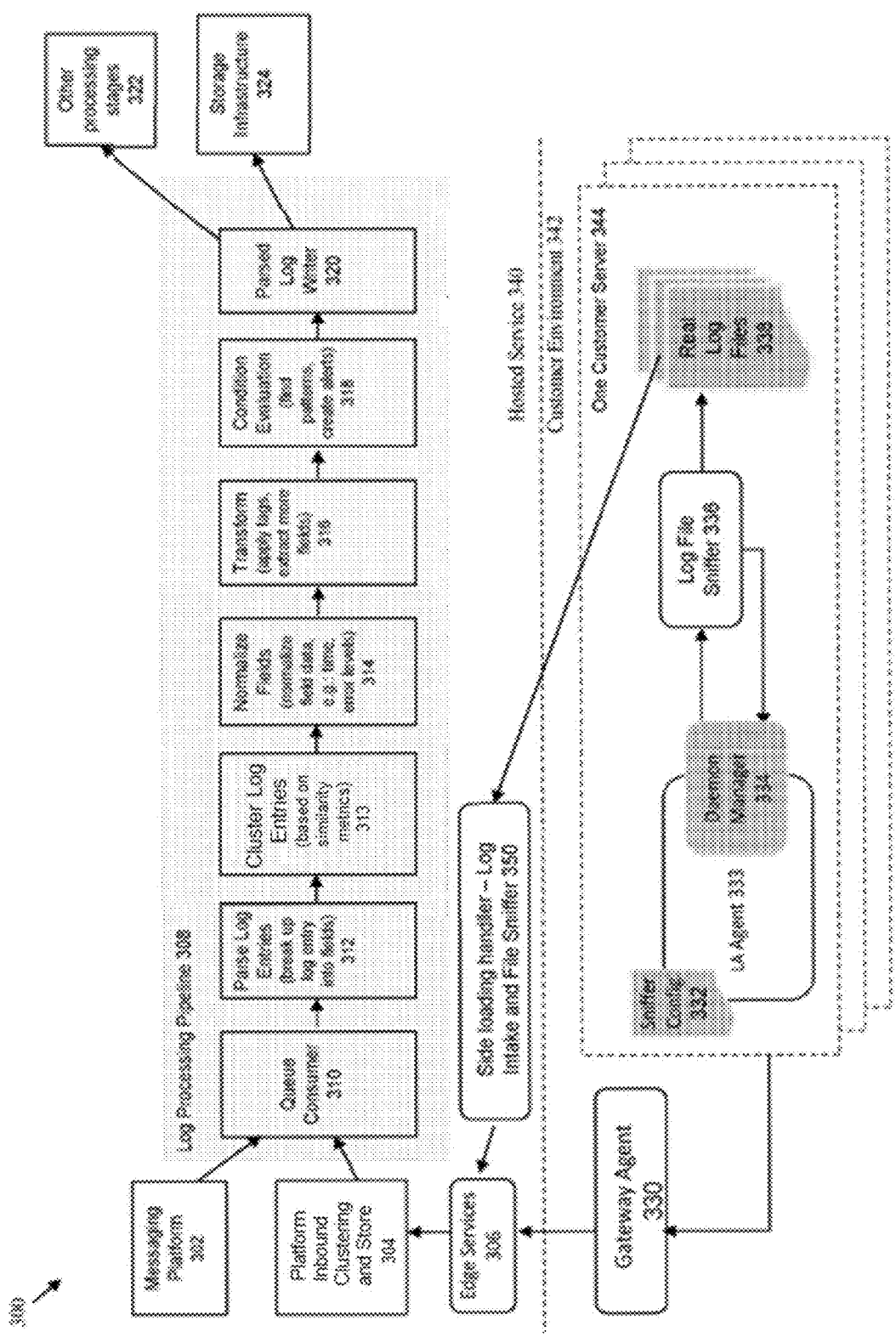
Figure 3C:
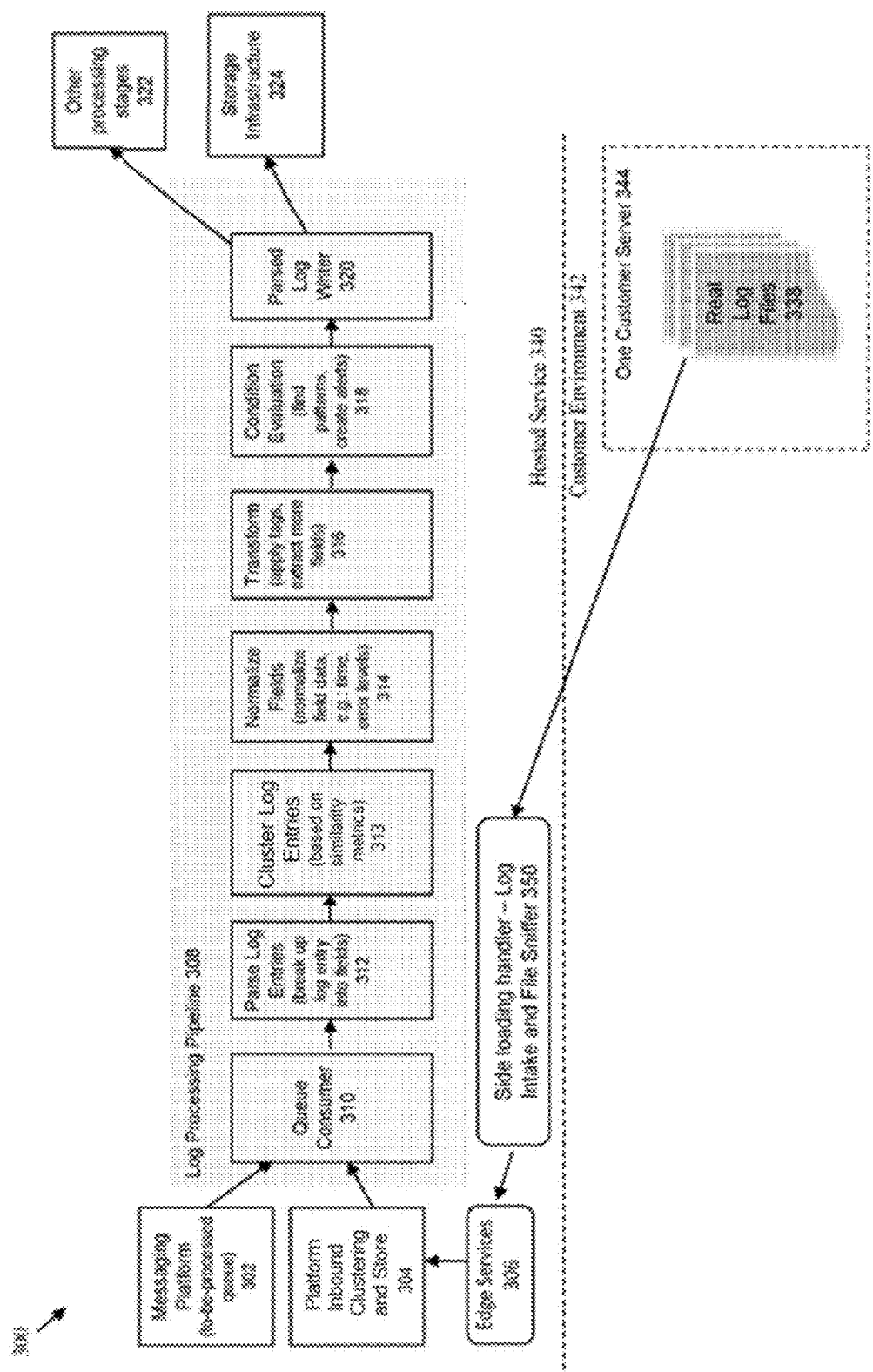

As shown in FIG. 3B, some embodiments provide a side loading mechanism 350 to collect log data without needing to proceed through an agent 333 on the client side. In this approach, the user logs into the server to select one or more files on a local system. The system will load that file at the server, and will sniff through that file (e.g., by having the user provide the log type, attempting likely log types, rolling through different log types, or by making an educated "guess" of the log type). The sniffing results are then passed to the Edge Services and process as previously described. In the embodiment, of FIG. 3C, only the side loading mechanism 350 exists to gather the log files—where the agent/sniffer entities are either not installed and/or not needed on the client server 344.

Typically, companies purchase items (e.g., products or services) from suppliers. In return, those suppliers send documents (e.g., invoices) listing the purchased items. However, for many companies, each line item on the document needs to correspond to a particular code (e.g., a general ledger account number) before the document can be processed (e.g., invoice paid). The codes facilitate the monitoring of transactions and reporting. However, physical (e.g., paper) documents received from suppliers do not generally include the code for each line item. Instead, the code is usually listed on a related document (e.g., a purchase order) that corresponds to the document. If that related document is not available, a user may need to search for the correct code to enter into the application, so that the document can be processed. However, users often spend large amounts of time trying to find the correct code for each line item included in documents, so that the documents can be processed. Searching for the correct code is time consuming and inefficient. In some cases, roughly 60% of a user's available time is typically spent searching through a large database for the correct code to apply to a line item of a document.

Certain embodiments of the present disclosure relate to a data-driven prediction of a specific value in one or more data fields. Rather than have a user manually look up the code for line items of a document, certain embodiments relate to systems and methods that evaluate characteristics of previously-processed documents and/or the data inputted by a user (e.g., an AP clerk) to predict the correct combination of code segments that characterize a line item of a document. In some implementations, the user may not know any portion of the correct code. In this case, the user can provide additional information about the line item, such as a description, the provider information, and item value, and so on. A model can process the data entered by the user (and detect correlations with other previously processed documents, which would include the code for each line item) and predict the code and one or more alternative recommendations for the correct code. In some implementations, the user does know at least a portion of the account code. For example, the user knows at least one code segment of a plurality of code segments that make up the complete code. In this case, the model can process the one or more code segments known to the user to predict the remaining (or unknown to the user) code segments to complete the code. As the user is typing in data into any data field presented on the interface, if a trigger is detected (e.g., the user presses the "tab" key), the systems and models may send the data entered by the user to the model (e.g., using a REST endpoint) for processing. The model can return a prediction of a combination of one or more code segments needed to complete the code. The predicted code segments can be automatically be presented in a corresponding data field presented on the interface. For example, the data fields with missing code segments can be populated (e.g., defaulted) with the predicted values of the code segments in an autocomplete and/or type ahead manner.

In some implementations, the code segments are individually processed. For example, each code segment of the code may be differentiated, such that each different code segment has a different set of drivers or features that influence the prediction of that code segment. In implementations where code segments are individually predicted, a model may be trained for each data field displayed on the interface. In some implementations, a single model may be trained for the entire code, such that the model predicts remaining code segments of a code when the user inputs at least one code segment of the code.

The model may be trained on a set of previously-processed documents. For example, a set of previously-processed documents may include invoices listing one or more line items. Each line item may correspond to a code, such as a general ledger account code. In some implementations, machine-learning algorithms or techniques used for the prediction can include an ensemble of multi-label classifiers (e.g., supervised learning), artificial neural networks (including backpropagation, Boltzmann machines, etc.), bayesian statistics (e.g., bayesian networks or knowledge bases), logistical model trees, support vector machines, information fuzzy networks, Hidden Markov models, hierarchical clustering (unsupervised), self-organizing maps, clustering techniques, and other suitable machine-learning techniques (supervised or unsupervised). For example, a model training system can be configured to retrieve one or more machine-learning or artificial-intelligence algorithms stored in a data store to generate an artificial neural network that can identify patterns or correlations within a training data set. As a further example, the artificial neural network can learn that when a data object (e.g., data inputted by a user) includes value A and value B, then value C is predicted as relevant data for the user who originally inputted the data object. In yet another example, a support vector machine can be used either to generate output data that is used as a prediction, or to identify learned patterns within the data set. Additionally, the model may be configured to perform a prediction capability for codes and/or other data (e.g., provider information, such as an address). The model may include a code predictor, and a REST endpoint may enable data to be passed between the model, which operates in an artificial intelligence network environment, and the application. The REST call may be triggered upon detecting a particular user interaction (e.g., the user entering "tab"). When the REST call is triggered, the data entered through the interface may be sent to the model, and a predicted code and/or one or more code segments may be returned back to the interface and automatically displayed in respective data fields of the interface. In some implementations, a predictor may be integrated into the model. Further, a REST endpoint may be integrated directly into the application that provides the interface for entering codes or code segments.

Certain embodiments of the present disclosure may include the automatic entry of documents, for example, in a batch mode. The automatic and batch import of documents into the application may avoid the need for any human input. As such, the model may also predict code segments without user interaction, for example, by automatically predicting code segments for the documents that have been imported in a batch mode. In some implementations, during the automatic prediction of code segments, if the confidence score of a particular prediction is low (e.g., below a threshold), then the predicted code segment may still be populated in the interface, but may also be flagged for further review by a user. In some implementations, for predictions with low confidence scores, the user may be required to search for and manually enter the code segment.

In some implementations, the interface may provide autocomplete functionality when a trigger event is detected after the user inputs data into the interface. The trigger event may be any event, including detecting a "tab" keystroke, an "enter" keystroke, a click, a tap, a swipe, or any other suitable event. The user may enter values into one or more data fields presented on the interface, and remaining empty data fields may be automatically populated with the predicted values of the code segments. If a user changes any portion of the predicted code segments, or even any portion of the data entered by the user, that change is detected by the model (e.g., automatically or on a regular basis when the model is retrained, such as on a daily basis) to improve future predictions. Further, as the user is typing in the changes to the entered or predicted values, the remaining data fields are automatically populated with the predicted code segments based on the changed values. In some implementations, the interface may provide type-ahead functionality while the user is entering data in real-time. The interface may automatically predict remaining code segments while the user is typing and the values of the predicted code segment may be presented in the data fields displayed in the interface as the user types in real-time. In this example, the interface does not need to wait to detect a trigger event. Instead, the interface may send data to the model (e.g., using the REST endpoint) as each character is entered into a data field. The type-ahead functionality may also display one or more alternative recommendations of predictions of the code segments. As a non-limiting example, as the user types in characters in a data field of the AP interface, three different options for completing the code segment may be presented. Those options may branch off from the third character entered by the user. As long as those options are ordered, then as the user types the third character, the third option may be presented. As the user types in the fourth character, the AP interface may present (within the data field) whichever option is still valid and/or a set of new predictions or recommendations for completing the code segment.

In some implementations, documents may include one or more line items. Each line item may correspond to an item (e.g., product or service). Further, each line item may correspond to a separate code that enables the monitoring of transactions associated with the line item. For example, the code may identify which cost center is involved in this line item, which department is responsible for initiating ordering the item, and so on. A code can have any number of different values (e.g., any combination of letters, numbers, or special American Standard Code for Information Interchange (ASCII) characters). In some implementations, when a user runs the application, the interface may be presented on the computing device operated by the user. When the user types in data about a line item, the application automatically triggers a REST service that processes any data entered by the user (e.g., basic information about the line items) and returns a prediction of one or more code segments and/or a set of alternative code segments that complete a code. The predicted code segments can be automatically populated in respective data fields of the interface. If the user modifies any of the predicted code segment values, that feedback is sent back to the model to improve future predictions, for example, at the time the model is retrained.

Codes may include a particular and predefined combination of code segments. Each code segment may include any number of characters (e.g., ASCII characters) in any order. In some implementations, the combinations of code segments (e.g., values) can be stored (e.g., at a database) as a single value. The various code segments may be a concatenation of different data field values of the code. In some implementations, each code segment can be stored individually. The various code segments can be retrieved and combined into a complete code. The combination of code segments can be stored in a dataset, which represents the complete code.

It will be appreciated that the present disclosure is not limited to prediction code segments of codes. Other data can be predicted that can describe a line item of a document or any document information. For example, the user may type in values representing a name in one data field and values representing an address in another data field. A phone number may be predicted and auto-populated into another data field. If the user revises the values in the address data field, one or more other data fields may be automatically updated (e.g., the phone number may be automatically repopulated).

In some implementations, a code segment can represent a characteristic of the line item. Non-limiting examples of characteristics represented by code segments can include the department that ordered the item, the type of expense, the provider of the item, the cost center associated with the item, and other suitable characteristics.

It will be appreciated that the present disclosure is not limited to implementations, in which a document with a line item per item ordered, has sufficient information to derive a code. Another implementation may include the example, in which a code is predicted based on transaction information, such as a description. In both implementations, category and word vectorization (or some variation) enables prediction or generation of the outcome. It will be appreciated that the embodiments described herein could be used to predict test codes based on medical tests, drug codes based on pharmaceuticals, and/or any other suitable prediction of codes or identifiers. It will also be appreciated that the embodiments described herein can be used to derive any type of code based on a set of driver data, as opposed to predicting the code. For example, instead of predicting a code based on input from a user corresponding to a description of the line item, the description of the line item may be used to derive or generate the code using the embodiments described herein.

It will be appreciated that the implementations described above regarding certain combinations of portions of code that are frequently used together can be applied to use cases beyond codes. For example, a user may be filling out an online form. There may be combinations of items that are frequently used together. Certain embodiments of the present disclosure may learn the precise combinations of multiple values together in a data field. If the user added two particular items to an online shopping cart, the model can automatically identify a number of other items to recommend to the user. The model may evaluate a data set of all previous purchases and determine that every time (frequently) when users purchase the two particular items, they also purchase a number of other items (which can ultimately be recommended to the user who added the two particular items to the cart). In the code examples described above, the model may not always detect a correlation between certain code segments. However, the model can identify the relationships between the different code segments, and extend the implementations described above to auto-populate the dependent code segments based on the previous values of code segments entered into data fields.

It will be appreciated that if there is a correlation between code segments, the model can detect that correlation, and use the correlation in future predictions. Training the model based on correct code segments (predicted in previous instances) and/or incorrect code segments (e.g., previous instances in which a user revised a predicted code segment) can improve the prediction of other code segments if a given segment has already been predicted correctly.

It will be appreciated that the implementations described above may be applicable to any interface that presents a collection of data segments or values concatenated into one data field, or individually presented in multiple data fields. In any scenario, where there is information on one or more interfaces that can be combined together in a vector, single value set, or single set of values, then the model can be used to predict remaining unfilled portions of the values as the user types at least a portion of the values, and automatically populate the predicted values into data fields presented on the interface. It will also be appreciated that a single field (e.g., a code) may be split up into multiple segments (e.g., code segments), and one or more remaining segments can be predicted and auto-populated into displayed data fields separately as the user types values into a data field associated with at least one segment. It will also be appreciated that multiple fields can be combined into a single set of outcomes. Once a user has entered values amounting to a certain percentage of the multiple fields, then the model can automatically predict and populate the remaining portion of the multiple fields.

Figure 4:
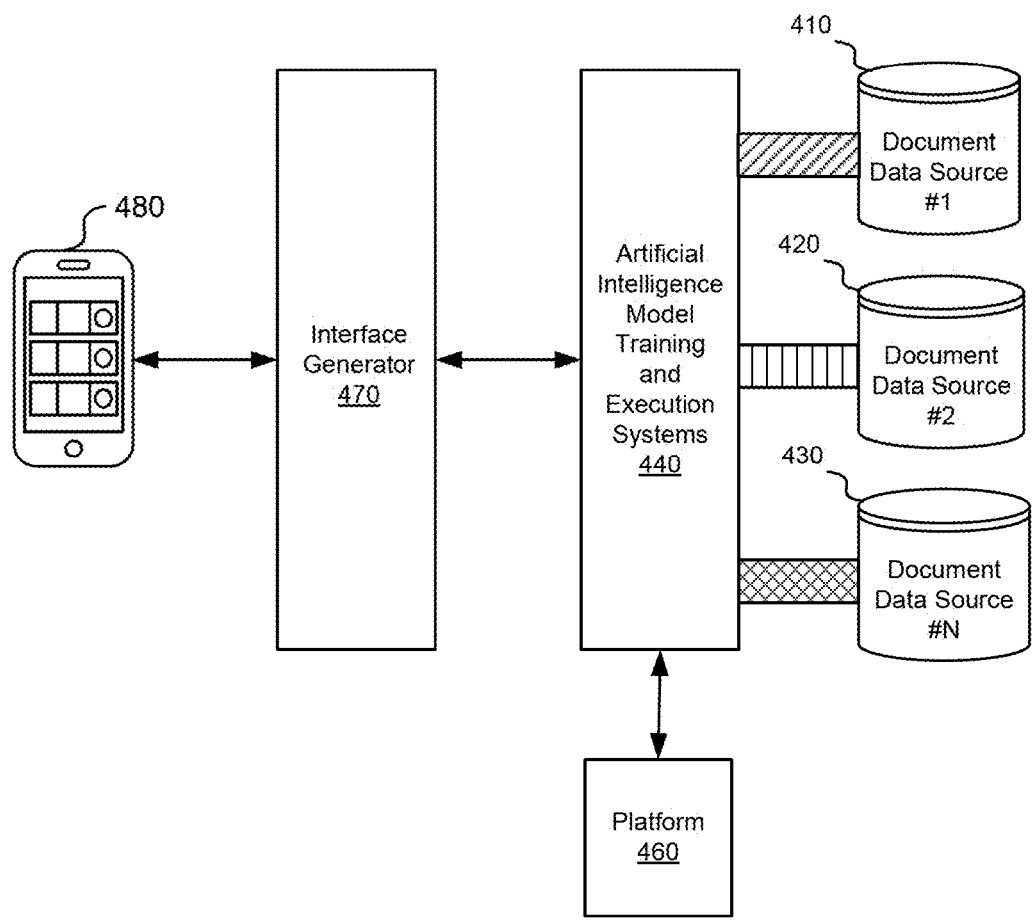
FIG. 4 is a block diagram illustrating an example network environment.

FIG. 4 illustrates network environment 400 for predicting one or more values in response to data inputted by a user into an interface. Network environment 400 may include any number of data sources, for example, document data source #1 410, document data source #2 420, and document data source #N 430. Document data source #1 410, document data source #2 420, and document data source #N 430 may be any data source either internal or external to a network.

These data sources may store data representing the processed and/or unprocessed documents. For example, if an individual of a company purchased a laptop, the provider of the laptop may send the company a document, which includes a line item characterizing the laptop. Whether or not the document was processed (e.g., invoice paid), the document and any related data not necessarily included in the document would be stored in any of the data sources. For the documents that have been processed, the documents and any related data may be stored in association with a code for characterizing aspects of the line item. In order for a document to be processed, a code associated with the item included in the document may need to be identified. The identified code may be stored in association with the document at any of the data stores 410 through 430.

In some implementations, artificial intelligence (AI) model training and execution systems 440 may evaluate the document data stored at document data source #1 410, document data source #2 420, and/or document data source #N 430 to train a model. The model may be trained using any artificial intelligence and/or machine-learning techniques, including but not limited to supervised, semi-supervised, or unsupervised learning techniques. The artificial intelligence and/or machine-learning techniques, which may be used to evaluate all or part of the document data, may detect correlations within the document data to train the model. For example, the model prediction can be based on a combination of line (e.g., a description of an item listed in a document) and a header (e.g., header description, etc.) details. In some implementations, AI model training and execution systems 440 may communicate with platform 460 to generate and train the model. For example, platform 460 may create and/or maintain the codes and code segments. Platform 460 may monitor all transactions associated with a code and use this information for reporting purposes.

Interface 470 may be an interface displayed on a computing device. Interface 470 may be generated as part of an application running on one or more servers (e.g., a cloud-based application). Interface 470 may display one or more data fields (e.g., horizontally on a screen). Each data field displayed on the interface may be configured to receive input from a user, and to auto-populate the content of the data field with values. User device 480 may access interface 470 in order to, for example, enter a document into an application, so that the document can be processed. As part of entering a document into the application using interface 470, the user operating user device 480 may have to search for a code to associate with the item included in a line item of a document. The user may enter one or more values into a data field of interface 470. The data entered by the user may automatically be transmitted to AI model training and execution systems 440 (e.g., using a REST endpoint) for processing. AI model training and execution systems 440 may evaluate the data entered by the user to predict one or more code segments that the user will need to complete the code. The predicted one or more code segments may be transmitted back to interface 470 and auto-populated into the respective data fields (e.g., the fourth code segment in a code may be displayed in a data field representing the fourth code segment).

It will be appreciated that user device 480 may be any portable electronic device (e.g., a tablet device, a laptop, a smartphone, etc.) or any non-portable electronic device (e.g., a desktop computer, an electronic kiosk, etc.). While user device 480 is illustrated in FIG. 4 as a mobile device for the purpose of providing an example, the present disclosure is not limited thereto.

Figure 5:
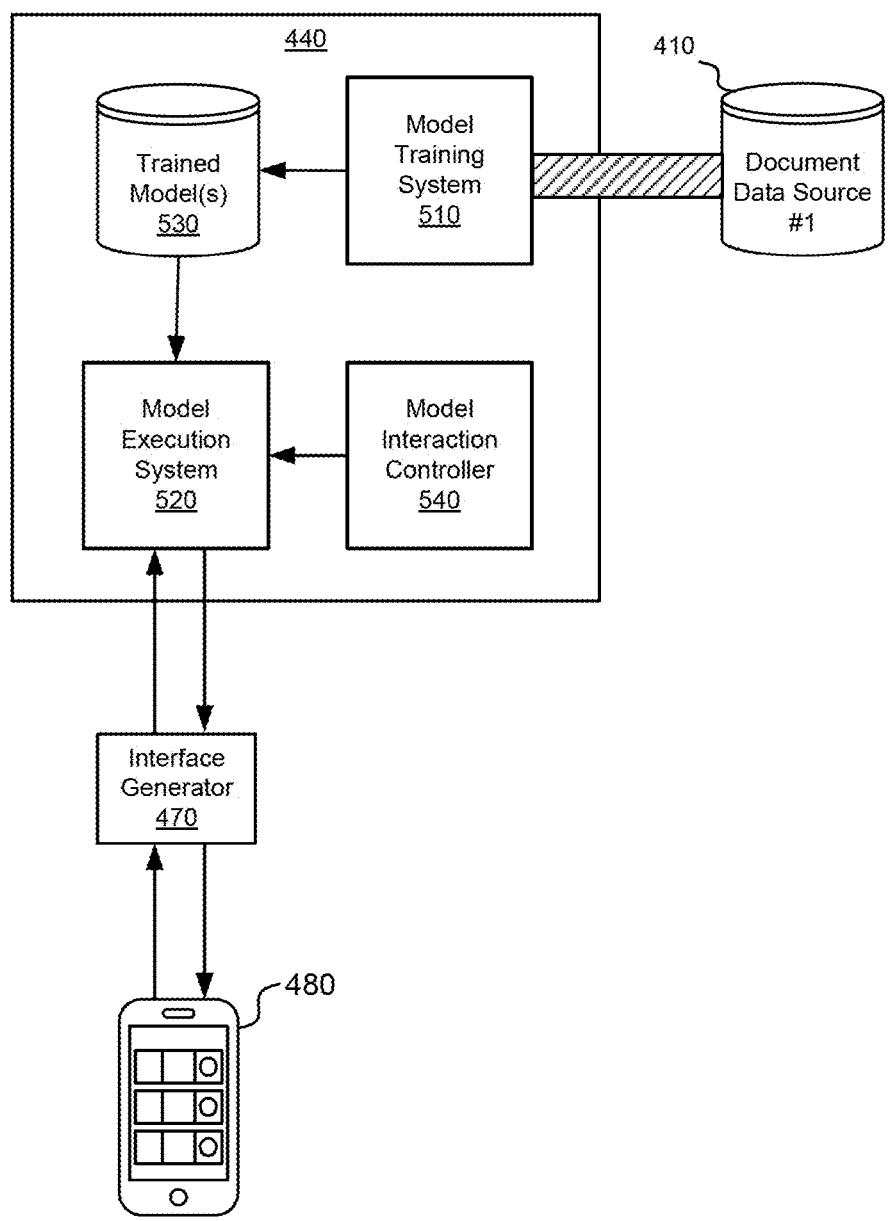
FIG. 5 is a block diagram illustrating another example network environment, according to some aspects.

FIG. 5 is a block diagram illustrating an example of a network environment for predicting remaining code segments of a code. Similar to network environment 400, network environment 500 may include data sources, such as document data source 410, AI model training and execution systems 440, interface generator 470, and user device 480. Network environment 500, however, may be provided to further describe the components of AI model training and execution systems 440. AI model training and execution systems 440 may be configured to include several components, including model training system 510, model execution system 520, trained models data store 530, and model interaction controller 540.

Model training system 510 may include a processor for processing data and storage device for storing data. The processor may execute code that, when executed, runs executable code causing one or more machine learning or artificial intelligence algorithms to be performed on the document data stored at document data source 410. The document data stored at document data source 410 may be a training data set used for training a model. For example, the document data source 410 may store a plurality of documents that have been previously processed. Each document of the plurality of documents may include an item and a corresponding code that characterizing one or more aspects of the item. The code that corresponds to an item may be used as labeled data in a supervised learning algorithm.

In some implementations, AI model training and execution systems 440 may be comprised of model training system 510, model execution system 520, trained models data store 530, and model interaction controller 540. Model training system 510 may execute a machine-learning algorithm on the labeled data to train a model that detects and stores dependencies between code segments and items of the training data set (e.g., the documents stored in document data source 410). For example, the model may detect dependencies between code segments when a code segment is always followed by one of three different code segments in a code. Thus, the model may store that pattern, so that any test data (e.g., data inputted into the model after the model is trained) inputted into the model may be evaluated based on the detected dependencies. If, for example, the test data includes the code segment, the model may generate an output that represents the three possible code segments that can follow the code segment.

In some implementations, training the model using machine learning or artificial intelligence algorithms may include ensemble learning methods, such as bagging, boosting or stacking techniques. For example, a single model may be weaker than multiple model, and thus, a bagging technique may be used to train multiple models independently on a training data set. The output of each model may be combined using an averaging technique, and the combined and averaged output may be used to predict the remaining portions of the code. In some implementations, a boosting technique may be used to train multiple models in a sequential and adaptive manner. The output of each model is combined in a weighted average to generate a final output that can be used to predict the remaining portions of the code.

The trained models may be stored at trained model data store 530. For example, trained model data store 530 may store a neural network comprising a plurality of nodes. Each node may correspond to a weight that represents a probability of a feature occurring or the contribution of that feature on a final output. The nodes and the corresponding weights of the neural network may be stored at trained model data store 530. Other non-limiting examples of models that can be stored at trained model data store may include a decision tree model, such as Random Forest, Naïve Bayes model, logistic regression model, and a deep learning model.

In some implementations, model execution system 520 may execute one or more trained models stored at trained model data store 530. Executing a model may include inputting one or more items of data received from the interface generated by interface generator 470 (e.g., the data representing a code segment or a portion thereof inputted by a user into a data field presented on the interface) into the model and generating one or more outputs in response to receiving the one or more items of data. The one or more outputs may include intermediate values (e.g., weights) generated by the model before reaching a final output. The intermediate values may contribute to the final output.

In some implementations, model interaction controller 540 may include a processor configured to execute executable code. The executable code may control interactions between the data fields presented on the interface generated by interface generator 470. As a non-limiting example, the interface may display five data fields. Each data field may be configured to receive input or to automatically populate a value predicted to be a code segment. Four of the five data fields may correspond to code segments of a code. The fifth data field may represent be configured to receive additional information about an item, such as a description or summary. If a user inputs text into the description data field (e.g., the fifth data field), the text may be transmitted using a REST service to the model execution system 520 for processing by the trained model. The trained model may generate one or more results that are transmitted back to the interface using the REST service. The interface may display four predicted code segments, one predicted code segment in each of the remaining four data fields. The four predicted code segments may represent the predicted code that corresponds to the description inputted into the fifth data field. The predicted code, however, may not be correct. In this case, the user may revise one of the four predicted code segments by inputting the correct code segment values into one of the four data fields. The newly inputted data may be transmitted again back to the model execution system 520 using the REST service. At this point, the revision of one of the predicted code segments may correspond to an interaction between data fields. Thus, the model interaction controller 540 may detect that a predicted code segment was corrected, and may modify the trained model to bias towards predicting the updated code segment value, instead of the originally-predicted code segment value. That is, the model interaction controller 540 can learn the changes made to predicted code segments over time and update the model to generate predictions that are more accurate.

Figure 6:
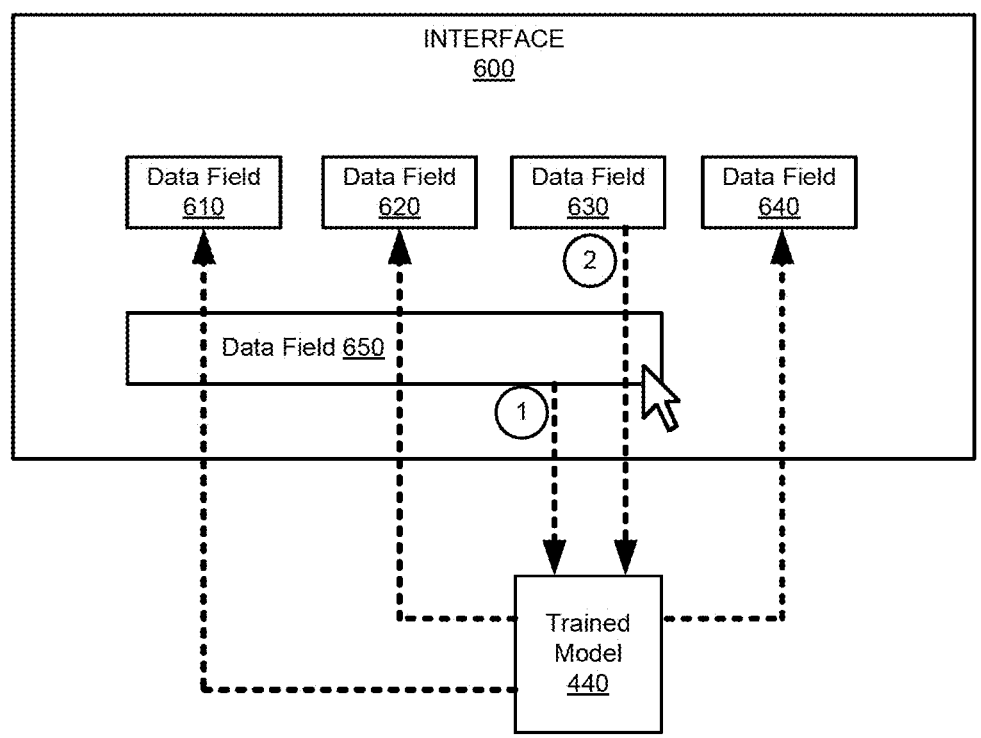
FIG. 6 is an example of an interface depicting a functional example of predicting code segments.

FIG. 6 illustrates an example of interface 600. As a non-limiting example, interface 600 may include a plurality of data fields, including at least data fields 610 through 650. Each one of data fields 610 through 650 may be configured to receive input from a user operating a computing device. Further, each one of data fields 610 through 650 may be configured to auto-populate values in response to user input.

As a non-limiting example, a user may access interface 600 in order to enter details of a document, so that the document may be processed (e.g., invoice paid). The user may access interface 600 using an application. In this non-limiting example, data fields 610 through 640 are each code segments of a code. The combination of data fields 610 through 640 (in that specific order) makes up a complete code. Further, data field 650 may be configured to receive input corresponding to a description of an item listed in a line item of the document. In the example illustration of FIG. 6, the user may only know one code segment of the four code segments that make up the complete code. The user may only know the code segment that corresponds to data field 630. For example, the code segment corresponding to data field 630 may represent the department for which the item was ordered. Thus, at step 2, the user can enter the code segment into data field 630. Initially, the data entered into data field 630 can be transmitted to the trained model stored at AI model training and execution systems 440 (e.g., using a REST endpoint). The trained model can evaluate the data entered into data field 630, and generate an output used to predict values to auto-populate in data fields 610, 620, 640, and 650. The predicted values can be sent from the trained model back to interface 600, and the predicted values can be auto-populated into data fields 610, 620, 640, and 650.

Continuing with the non-limiting example, the user may notice that the values that were auto-populated into data field 650 do not correctly describe the item listed on the document. The user may edit the description (at step 1) and press the "tab" key to update the predicted values. Upon the "tab" key being pressed, the updated values entered by the user into data field 650 can be transmitted to the trained model (e.g., using a REST service). The trained model may evaluate the values entered into data field 630 and the updated values entered by the user to generate another prediction of the remaining code segments to be auto-populated into data fields 610, 620, and 640. The updated predicted values can be sent back to interface 600, and data fields 610, 620, and 640 can be auto-populated with the update predicted values. The trained model can also improve future predictions due to the updated values received from the user as feedback.

It will be appreciated that the prediction of the full combination of code segments of the code may be generated to the user based on input inputted by the user of data that is not part of the code, such as a description of the item represented or associated with the code. The AI mode can then predict one, multiple or all code segments of the code based on the data inputted by the user, which is not a code segment or a portion of a code segment, but rather is data inputted by the user that can be used to identify a code or code segment, such as the description of the item, or any attribute representing or characterizing the attribute, such as an originator of the item. In some implementations, the combination of the code segments may be predicted by any available or accessible data, but may not need any user input to initiate the prediction.

Figure 7:
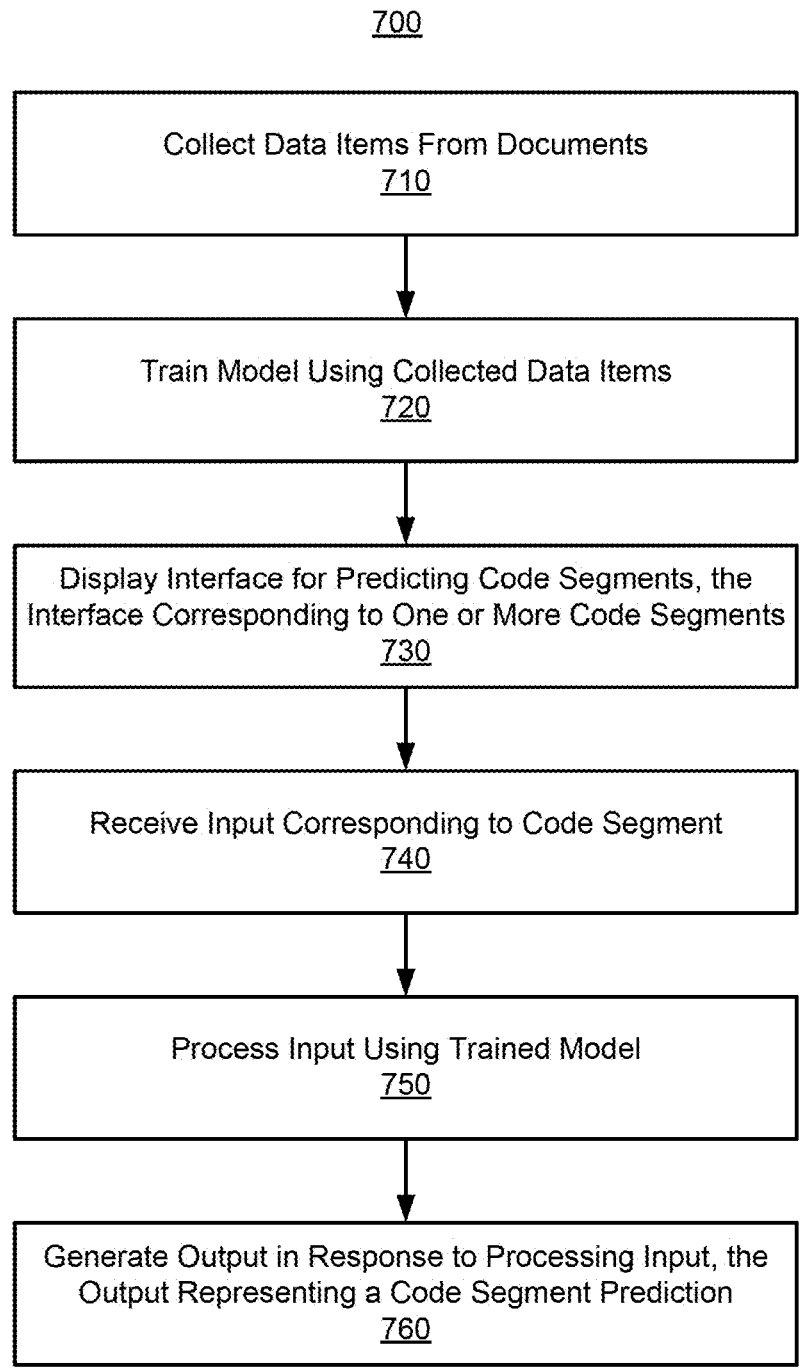
FIG. 7 is a flowchart illustrating an example of a process for predicting code segments of a code in response to user input.

FIG. 7 is a flowchart illustrating an example of a process for intelligently predicting remaining code segments of a code. Process 700 may be performed, at least in part, by any of the components of FIGS. 4 and 5. For example, process 700 may be performed by AI model training and execution systems 440 and/or any of the components therein. Further, process 700 may be performed to predict remaining data field values (e.g., code segments) of a code in response to receiving at least a portion of the code from user input.

Process 700 may begin at block 710 where a plurality of documents are collected and stored. Each document may include one or more data items (e.g., a line item) that represent an item ordered from a company. For example, the document may be an invoice and the data item may be a line item representing a product or service purchased from a supplier. The data item may include information that characterizes the item, such as for which department the item was purchased, the code that corresponds to the data item (used for reporting or tracking transactions), and so on. The documents may be collected from various network locations across a network and stored at a single database (or multiple databases) as document data. The document data may represent one or more documents that characterize resources exchanged at previous times (e.g., products or services purchased in the past). Each document of the one or more documents may include one or more data items representing a resource exchanged (e.g., an item ordered). Each data item of the one or more data items may include a code comprised of an ordered sequence of a plurality of code segments (e.g., a general ledger account code). Each code segment of the ordered sequence may characterize an aspect of the corresponding resource exchanged (e.g., the cost center associated with the item ordered). The collected document data may be used as a training data set for the machine learning and artificial intelligence algorithms.

At block 720, the AI model training and execution systems 440 may execute one or more machine-learning or artificial-intelligence algorithms on the collected document data to train a model. The model may be trained to generate one or more outputs. The one or more outputs may be evaluated to predict remaining code segments of a code in response to receiving at least one code segment (or a portion thereof) of the code from user input. The model may be trained based, at least in part, on the plurality of code segments included in the one or more documents. For example, the model may be trained by detecting one or more dependencies between items and codes listed in the documents of the training data set. The model training system 440 may perform the training of the model at block 720.

At block 730, an interface may be displayed as part of an application. The interface may be configured to receive inputs from users. The inputs may be received at any of a plurality of input elements presented on the interface. Each input element may represent a data field, in which values can be inputted by the user. At least some of the data fields presented in a specific order on the interface may represent a code. Each input element of the plurality of input elements may be configured to individually receive a value representing a code segment or to display a value representing a predicted code segment for selection by a user.

At block 740, the interface may receive an input at one or more input elements of the plurality of input elements displayed on the interface. The input may be a particular code segment of a particular code. The user may input the values particular code segment into the input element. For example, if the user only knows the values for the first code segment of five code segments, the user may select the first input element (e.g., the input element that corresponds to the first code segment) and input the values. The particular code may correspond to a particular resource exchanged included in a particular document. The particular document may not be included in the training data set.

At block 750, the values of the particular code segment that was inputted into the first input element by the user may be transmitted to the trained model (e.g., using a REST service). The values of the particular code segment inputted by the user may be inputted into the trained model for processing. At block 760, the model may generate one or more outputs in response to processing the input at block 750. Each output of the one or more outputs may represent a prediction of one or more remaining code segments of the particular code. The remaining code segments may be the code segments of the code that remain after the user inputs the first code segment into the interface. Each remaining code segment of the one or more remaining code segments may correspond to a remaining portion of the particular code other than the particular code segment. The particular code segment and the one or more remaining code segments may represent the complete code. The one or more outputs may be transmitted to the interface using the REST service. The interface may then display the one or more outputs, which represent the predicted code segment values for the remaining code segments of the code. Each predicted code segment may be displayed in the input element that corresponds to that code segment. For example, the predicated values for the second code segment of the code may be auto-populated within the displayed input element that represents the second code segment.

Figure 8:
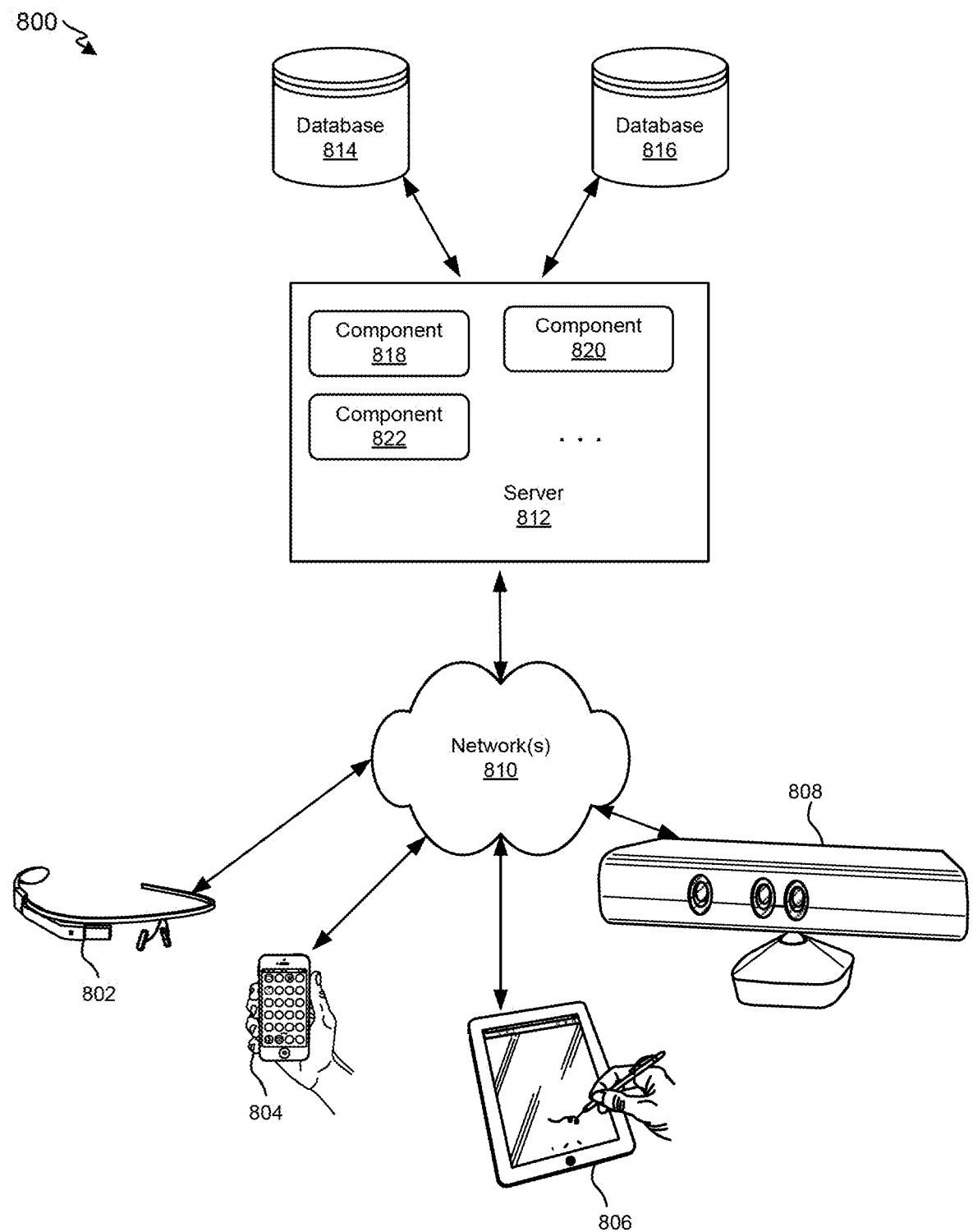
FIG. 8 is a simplified diagram illustrating a distributed system for implementing one of the embodiments.

FIG. 8 depicts a simplified diagram of a distributed system 800 for implementing one of the embodiments. In the illustrated embodiment, distributed system 800 includes one or more client computing devices 802, 804, 806, and 808, which are configured to execute and operate a client application such as a web browser, proprietary client (e.g., Oracle Forms), or the like over one or more network(s) 810. Server 812 may be communicatively coupled with remote client computing devices 802, 804, 806, and 808 via network 810.

In various embodiments, server 812 may be adapted to run one or more services or software applications provided by one or more of the components of the system. In some embodiments, these services may be offered as web-based or cloud services or under a Software as a Service (SaaS) model to the users of client computing devices 802, 804, 806, and/or 808. Users operating client computing devices 802, 804, 806, and/or 808 may in turn utilize one or more client applications to interact with server 812 to utilize the services provided by these components.

In the configuration depicted in the figure, the software components 818, 820 and 822 of system 800 are shown as being implemented on server 812. In other embodiments, one or more of the components of system 800 and/or the services provided by these components may also be implemented by one or more of the client computing devices 802, 804, 806, and/or 808. Users operating the client computing devices may then utilize one or more client applications to use the services provided by these components. These components may be implemented in hardware, firmware, software, or combinations thereof. It should be appreciated that various different system configurations are possible, which may be different from distributed system 800. The embodiment shown in the figure is thus one example of a distributed system for implementing an embodiment system and is not intended to be limiting.

Client computing devices 802, 804, 806, and/or 808 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 802, 804, 806, and 808 may be any other electronic device, such as a thin-client computer, an Internet-enabled gaming system (e.g., a Microsoft Xbox gaming console with or without a Kinect® gesture input device), and/or a personal messaging device, capable of communicating over network(s) 810.

Although exemplary distributed system 800 is shown with four client computing devices, any number of client computing devices may be supported. Other devices, such as devices with sensors, etc., may interact with server 812.

Network(s) 810 in distributed system 800 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 810 can be a local area network (LAN), such as one based on Ethernet, Token-Ring and/or the like. Network(s) 810 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 812 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 812 may be adapted to run one or more services or software applications described in the foregoing disclosure. For example, server 812 may correspond to a server for performing processing described above according to an embodiment of the present disclosure.

Server 812 may run an operating system including any of those discussed above, as well as any commercially available server operating system. Server 812 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 812 may include one or more applications to analyze and consolidate data feeds and/or event updates received from users of client computing devices 802, 804, 806, and 808. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 812 may also include one or more applications to display the data feeds and/or real-time events via one or more display devices of client computing devices 802, 804, 806, and 808.

Distributed system 800 may also include one or more databases 814 and 816. Databases 814 and 816 may reside in a variety of locations. By way of example, one or more of databases 814 and 816 may reside on a non-transitory storage medium local to (and/or resident in) server 812. Alternatively, databases 814 and 816 may be remote from server 812 and in communication with server 812 via a network-based or dedicated connection. In one set of embodiments, databases 814 and 816 may reside in a storage-area network (SAN). Similarly, any necessary files for performing the functions attributed to server 812 may be stored locally on server 812 and/or remotely, as appropriate. In one set of embodiments, databases 814 and 816 may include relational databases, such as databases provided by Oracle, that are adapted to store, update, and retrieve data in response to SQL-formatted commands.

Figure 9:
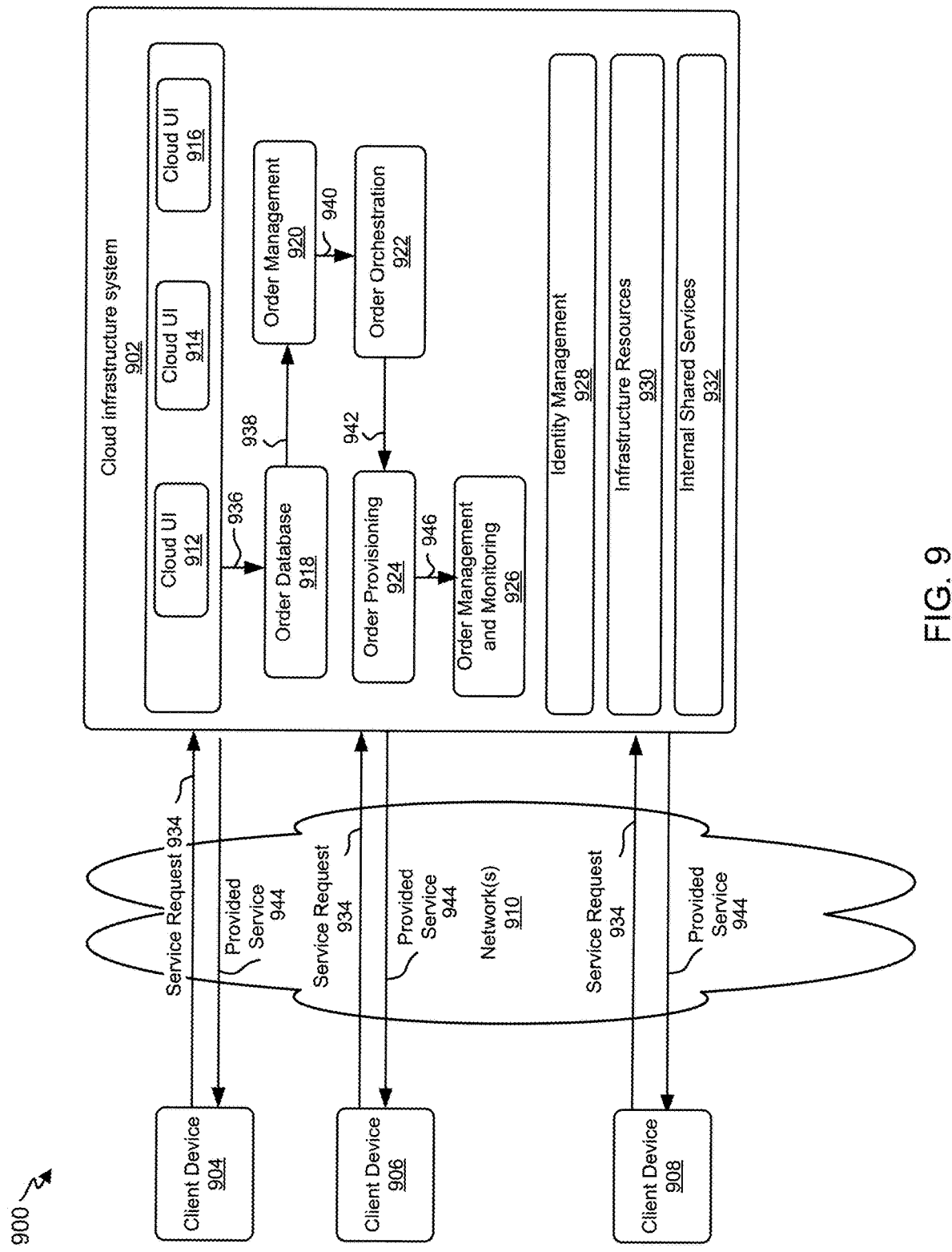
FIG. 9 is a simplified block diagram illustrating one or more components of a system environment.

FIG. 9 is a simplified block diagram of one or more components of a system environment 900 by which services provided by one or more components of an embodiment system may be offered as cloud services, in accordance with an embodiment of the present disclosure. In the illustrated embodiment, system environment 900 includes one or more client computing devices 904, 906, and 908 that may be used by users to interact with a cloud infrastructure system 902 that provides cloud services. The client computing devices may be configured to operate a client application such as a web browser, a proprietary client application (e.g., Oracle Forms), or some other application, which may be used by a user of the client computing device to interact with cloud infrastructure system 902 to use services provided by cloud infrastructure system 902.

It should be appreciated that cloud infrastructure system 902 depicted in the figure may have other components than those depicted. Further, the embodiment shown in the figure is only one example of a cloud infrastructure system that may incorporate an embodiment of the invention. In some other embodiments, cloud infrastructure system 902 may have more or fewer components than shown in the figure, may combine two or more components, or may have a different configuration or arrangement of components.

Client computing devices 904, 906, and 908 may be devices similar to those described above for 802, 804, 806, and 808.

Although exemplary system environment 900 is shown with three client computing devices, any number of client computing devices may be supported. Other devices such as devices with sensors, etc. may interact with cloud infrastructure system 902.

Network(s) 910 may facilitate communications and exchange of data between clients 904, 906, and 908 and cloud infrastructure system 902. Each network may be any type of network familiar to those skilled in the art that can support data communications using any of a variety of commercially-available protocols, including those described above for network(s) 810.

Cloud infrastructure system 902 may comprise one or more computers and/or servers that may include those described above for server 812.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 902 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 902 may be adapted to automatically provision, manage and track a customer's subscription to services offered by cloud infrastructure system 902. Cloud infrastructure system 902 may provide the cloud services via different deployment models. For example, services may be provided under a public cloud model in which cloud infrastructure system 902 is owned by an organization selling cloud services (e.g., owned by Oracle) and the services are made available to the general public or different industry enterprises. As another example, services may be provided under a private cloud model in which cloud infrastructure system 902 is operated solely for a single organization and may provide services for one or more entities within the organization. The cloud services may also be provided under a community cloud model in which cloud infrastructure system 902 and the services provided by cloud infrastructure system 902 are shared by several organizations in a related community. The cloud services may also be provided under a hybrid cloud model, which is a combination of two or more different models.

In some embodiments, the services provided by cloud infrastructure system 802 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 902. Cloud infrastructure system 902 then performs processing to provide the services in the customer's subscription order.

In some embodiments, the services provided by cloud infrastructure system 902 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 902 may also include infrastructure resources 930 for providing the resources used to provide various services to customers of the cloud infrastructure system. In one embodiment, infrastructure resources 930 may include pre-integrated and optimized combinations of hardware, such as servers, storage, and networking resources to execute the services provided by the PaaS platform and the SaaS platform.

In some embodiments, resources in cloud infrastructure system 902 may be shared by multiple users and dynamically re-allocated per demand. Additionally, resources may be allocated to users in different time zones. For example, cloud infrastructure system 930 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 932 may be provided that are shared by different components or modules of cloud infrastructure system 902 and by the services provided by cloud infrastructure system 902. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 902 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 902, and the like.

In one embodiment, as depicted in the figure, cloud management functionality may be provided by one or more modules, such as an order management module 920, an order orchestration module 922, an order provisioning module 924, an order management and monitoring module 926, and an identity management module 928. These modules may include or be provided using one or more computers and/or servers, which may be general purpose computers, specialized server computers, server farms, server clusters, or any other appropriate arrangement and/or combination.

In exemplary operation 934, a customer using a client device, such as client device 904, 906 or 908, may interact with cloud infrastructure system 902 by requesting one or more services provided by cloud infrastructure system 902 and placing an order for a subscription for one or more services offered by cloud infrastructure system 902. In certain embodiments, the customer may access a cloud User Interface (UI), cloud UI 912, cloud UI 914 and/or cloud UI 916 and place a subscription order via these UIs. The order information received by cloud infrastructure system 902 in response to the customer placing an order may include information identifying the customer and one or more services offered by the cloud infrastructure system 902 that the customer intends to subscribe to.

After an order has been placed by the customer, the order information is received via the cloud UIs, 912, 914 and/or 916.

At operation 936, the order is stored in order database 918. Order database 918 can be one of several databases operated by cloud infrastructure system 918 and operated in conjunction with other system elements.

At operation 938, the order information is forwarded to an order management module 920. In some instances, order management module 920 may be configured to perform billing and accounting functions related to the order, such as verifying the order, and upon verification, booking the order.

At operation 940, information regarding the order is communicated to an order orchestration module 922. Order orchestration module 922 may utilize the order information to orchestrate the provisioning of services and resources for the order placed by the customer. In some instances, order orchestration module 922 may orchestrate the provisioning of resources to support the subscribed services using the services of order provisioning module 924.

In certain embodiments, order orchestration module 922 enables the management of business processes associated with each order and applies business logic to determine whether an order should proceed to provisioning. At operation 942, upon receiving an order for a new subscription, order orchestration module 922 sends a request to order provisioning module 924 to allocate resources and configure those resources needed to fulfill the subscription order. Order provisioning module 924 enables the allocation of resources for the services ordered by the customer. Order provisioning module 924 provides a level of abstraction between the cloud services provided by cloud infrastructure system 900 and the physical implementation layer that is used to provision the resources for providing the requested services. Order orchestration module 922 may thus be isolated from implementation details, such as whether or not services and resources are actually provisioned on the fly or pre-provisioned and only allocated/assigned upon request.

At operation 944, once the services and resources are provisioned, a notification of the provided service may be sent to customers on client devices 904, 906 and/or 908 by order provisioning module 924 of cloud infrastructure system 902.

At operation 946, the customer's subscription order may be managed and tracked by an order management and monitoring module 926. In some instances, order management and monitoring module 926 may be configured to collect usage statistics for the services in the subscription order, such as the amount of storage used, the amount data transferred, the number of users, and the amount of system up time and system down time.

In certain embodiments, cloud infrastructure system 900 may include an identity management module 928. Identity management module 928 may be configured to provide identity services, such as access management and authorization services in cloud infrastructure system 900. In some embodiments, identity management module 928 may control information about customers who wish to utilize the services provided by cloud infrastructure system 902. Such information can include information that authenticates the identities of such customers and information that describes which actions those customers are authorized to perform relative to various system resources (e.g., files, directories, applications, communication ports, memory segments, etc.) Identity management module 928 may also include the management of descriptive information about each customer and about how and by whom that descriptive information can be accessed and modified.

Figure 10:
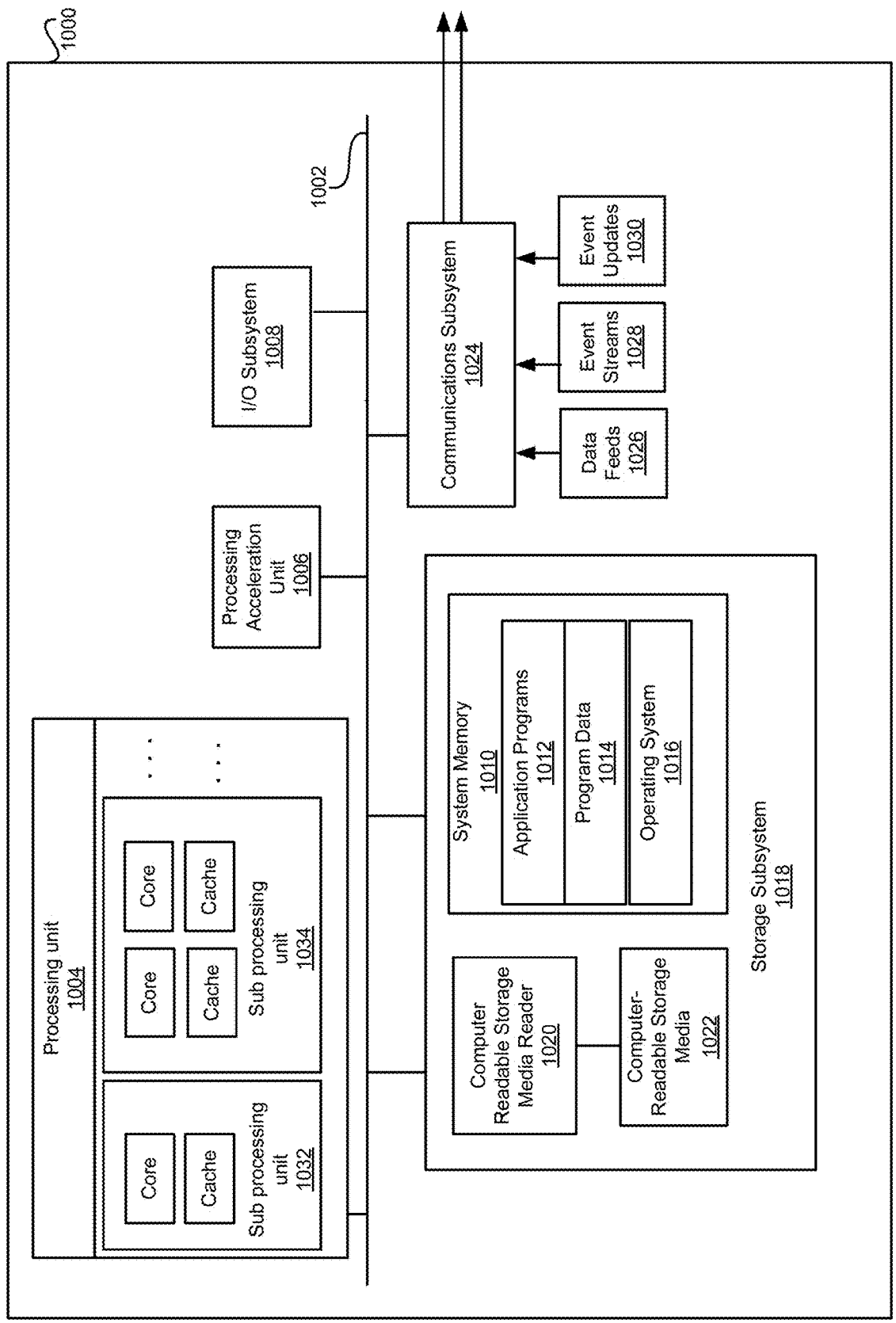
FIG. 10 illustrates an exemplary computer system, in which various embodiments of the present invention may be implemented.

FIG. 10 illustrates an exemplary computer system 1000, in which various embodiments of the present invention may be implemented. The system 1000 may be used to implement any of the computer systems described above. As shown in the figure, computer system 1000 includes a processing unit 1004 that communicates with a number of peripheral subsystems via a bus subsystem 1002. These peripheral subsystems may include a processing acceleration unit 1006, an I/O subsystem 1008, a storage subsystem 1018 and a communications subsystem 1024. Storage subsystem 1018 includes tangible computer-readable storage media 1022 and a system memory 1010.

Bus subsystem 1002 provides a mechanism for letting the various components and subsystems of computer system 1000 communicate with each other as intended. Although bus subsystem 1002 is shown schematically as a single bus, alternative embodiments of the bus subsystem may utilize multiple buses. Bus subsystem 1002 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1004, which can be implemented as one or more integrated circuits (e.g., a conventional microprocessor or microcontroller), controls the operation of computer system 1000. One or more processors may be included in processing unit 1004. These processors may include single core or multicore processors. In certain embodiments, processing unit 1004 may be implemented as one or more independent processing units 1032 and/or 1034 with single or multicore processors included in each processing unit. In other embodiments, processing unit 1004 may also be implemented as a quad-core processing unit formed by integrating two dual-core processors into a single chip.

In various embodiments, processing unit 1004 can execute a variety of programs in response to program code and can maintain multiple concurrently executing programs or processes. At any given time, some or all of the program code to be executed can be resident in processor(s) 1004 and/or in storage subsystem 1018. Through suitable programming, processor(s) 1004 can provide various functionalities described above. Computer system 1000 may additionally include a processing acceleration unit 1006, which can include a digital signal processor (DSP), a special-purpose processor, and/or the like.

I/O subsystem 1008 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1000 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1000 may comprise a storage subsystem 1018 that comprises software elements, shown as being currently located within a system memory 1010. System memory 1010 may store program instructions that are loadable and executable on processing unit 1004, as well as data generated during the execution of these programs.

Depending on the configuration and type of computer system 1000, system memory 1010 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1004. In some implementations, system memory 1010 may include multiple different types of memory, such as static random access memory (SRAM) or dynamic random access memory (DRAM). In some implementations, a basic input/output system (BIOS), containing the basic routines that help to transfer information between elements within computer system 1000, such as during start-up, may typically be stored in the ROM. By way of example, and not limitation, system memory 1010 also illustrates application programs 1012, which may include client applications, Web browsers, mid-tier applications, relational database management systems (RDBMS), etc., program data 1014, and an operating system 1016. By way of example, operating system 1016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1018 may also provide a tangible computer-readable storage medium for storing the basic programming and data constructs that provide the functionality of some embodiments. Software (programs, code modules, instructions) that when executed by a processor provide the functionality described above may be stored in storage subsystem 1018. These software modules or instructions may be executed by processing unit 1004. Storage subsystem 1018 may also provide a repository for storing data used in accordance with the present invention.

Storage subsystem 1000 may also include a computer-readable storage media reader 1020 that can further be connected to computer-readable storage media 1022. Together and, optionally, in combination with system memory 1010, computer-readable storage media 1022 may comprehensively represent remote, local, fixed, and/or removable storage devices plus storage media for temporarily and/or more permanently containing, storing, transmitting, and retrieving computer-readable information.

Computer-readable storage media 1022 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1000.

By way of example, computer-readable storage media 1022 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1022 may include, but is not limited to, Zip® drives, flash memory cards, universal serial bus (USB) flash drives, secure digital (SD) cards, DVD disks, digital video tape, and the like. Computer-readable storage media 1022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1000.

Communications subsystem 1024 provides an interface to other computer systems and networks. Communications subsystem 1024 serves as an interface for receiving data from and transmitting data to other systems from computer system 1000. For example, communications subsystem 1024 may enable computer system 1000 to connect to one or more devices via the Internet. In some embodiments communications subsystem 1024 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 1202.11 family standards, or other mobile communication technologies, or any combination thereof), global positioning system (GPS) receiver components, and/or other components. In some embodiments communications subsystem 1024 can provide wired network connectivity (e.g., Ethernet) in addition to or instead of a wireless interface.

In some embodiments, communications subsystem 1024 may also receive input communication in the form of structured and/or unstructured data feeds 1026, event streams 1028, event updates 1030, and the like on behalf of one or more users who may use computer system 1000.

By way of example, communications subsystem 1024 may be configured to receive data feeds 1026 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1024 may also be configured to receive data in the form of continuous data streams, which may include event streams 1028 of real-time events and/or event updates 1030, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1024 may also be configured to output the structured and/or unstructured data feeds 1026, event streams 1028, event updates 1030, and the like to one or more databases that may be in communication with one or more streaming data source computers coupled to computer system 1000.

Computer system 1000 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1000 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method, comprising:
collecting document data stored at one or more servers, the document data representing documents that correspond to resources exchanged at previous times, each document of the documents including data items representing a resource exchanged, each data item of the data items corresponding to a code comprised of an ordered sequence of a plurality of data fields, the code corresponding to each data item of the data items being used to facilitate monitoring the corresponding resource exchanged, and each data field of the ordered sequence of the plurality of data fields containing a data field value that characterizes an aspect of the corresponding resource exchanged;

training a model using the collected document data, the model having been trained by executing one or more machine-learning algorithms that train the model to generate an output in response to receiving at least one data field value of a data field of the code, and the model having been trained based, at least in part, using the data items included in the documents;

displaying an interface presenting a plurality of input elements, each input element of the plurality of input elements being configured to individually receive a data field value and to display a predicted data field value for selection by a user;

receiving an input at an input element of the plurality of input elements displayed on the interface, the input characterizing a particular aspect of a particular resource exchanged, wherein the particular resource exchanged corresponds to a particular document;

determining, based on the input characterizing the particular aspect of the particular resource exchanged, a particular data field value of a plurality of data field values of a particular code, the particular code corresponding to the particular resource exchanged corresponding to the particular document, wherein the particular code includes the plurality of data field values in a particular ordered sequence, the plurality of data field values displayable on the interface in the particular ordered sequence as a complete code for processing the particular document;

processing the input using the trained model;

in response to processing the input using the trained model, generating outputs of the model, each output of the outputs representing a prediction of a remaining data field value of the particular code, and each remaining data field value of the remaining data field values corresponding to a remaining portion of the particular code other than the particular data field value, such that the particular data field value and the remaining data field values represent the particular code; and displaying the particular data field value at the input element and the remaining data field values such that each remaining data field value of the remaining data field values is presented at a remaining input element of the plurality of input elements that is different from the input element that received the input, wherein remaining data field values and the particular data field value are displayed in the particular ordered sequence on the interface as the complete code for processing the particular document.

2. The computer-implemented method of claim 1, wherein displaying the predicted remaining data field values includes automatically presenting each remaining data field value of the remaining data field values within a remaining input element of the plurality of input elements in response to receiving the input at the input element.

3. The computer-implemented method of claim 1, wherein the predicted remaining data field values are automatically displayed at the remaining input element using one or more type-ahead techniques.

4. The computer-implemented method of claim 1, wherein training the model causes a relationship between two different data field values to be detected, the detection of the relationship indicating that the two different data field values formed at least a portion of a code included in a document of the documents.

5. The computer-implemented method of claim 1, wherein the particular code is stored at a server as a single data field, and wherein the particular data field value is a portion of the single data field.

6. The computer-implemented method of claim 1, wherein the particular code is stored at a server across a plurality of data fields, wherein the particular data field value is associated with one data field of the plurality of data fields, and wherein each remaining data field value of the remaining data field values corresponds to another data field of the plurality of data fields.

7. The computer-implemented method of claim 1, wherein the generation of the outputs of the model is triggered when a tab input is detected at the interface, wherein the tab input causes an input cursor to move from the input element of the plurality of input elements to another input element of the plurality of input elements.

8. A system, comprising:
one or more processors; and
a non-transitory computer-readable storage medium containing instructions which, when executed on the one or more processors, cause the one or more processors to perform operations including:

collecting document data stored at one or more servers, the document data representing documents that characterize resources exchanged at previous times, each document of the documents including data items representing a resource exchanged, each data item of the data items corresponding to a code comprised of an ordered sequence of a plurality of data fields, the code corresponding to each data item of the data items being used to facilitate monitoring the corresponding resource exchanged, and each data field of the ordered sequence of the plurality of data fields containing a data field value that characterizes an aspect of the corresponding resource exchanged;

training a model using the collected document data, the model having been trained by executing one or more machine-learning algorithms that train the model to generate an output in response to receiving at least one data field value of a data field of the code, and the model having been trained based, at least in part, using the data items included in the documents;

displaying an interface presenting a plurality of input elements, each input element of the plurality of input elements being configured to individually receive a data field value and to display a predicted data field value for selection by a user;

receiving an input at an input element of the plurality of input elements displayed on the interface, the input characterizing a particular aspect of a particular resource exchanged, wherein the particular resource exchanged corresponds to a particular document;

determining, based on the input characterizing the particular aspect of the particular resource exchanged, a particular data field value of a plurality of data field values of a particular code, the particular code corresponding to the particular resource exchanged corresponding to the particular document, wherein the particular code includes the plurality of data field values in a particular ordered sequence, the plurality of data field values displayable on the interface in the particular ordered sequence as a complete code for processing the particular document;

processing the input using the trained model;

in response to processing the input using the trained model, generating outputs of the model, each output of the outputs representing a prediction of a remaining data field value of the particular code, and each remaining data field value of the remaining data field values corresponding to a remaining portion of the particular code other than the particular data field value, such that the particular data field value and the remaining data field values represent the particular code; and displaying the particular data field value at the input element and the remaining data field values such that each remaining data field value of the remaining data field values is presented at a remaining input element of the plurality of input elements that is different from the input element that received the input, wherein remaining data field values and the particular data field value are displayed in the particular ordered sequence on the interface as the complete code for processing the particular document.

9. The system of claim 8, wherein displaying the predicted remaining data field values includes automatically presenting each remaining data field value of the remaining data field values within a remaining input element of the plurality of input elements in response to receiving the input at the input element.

10. The system of claim 8, wherein the predicted remaining data field values are automatically displayed at the remaining input element using one or more type-ahead techniques.

11. The system of claim 8, wherein training the model causes a relationship between two different data field values to be detected, the detection of the relationship indicating that the two different data field values formed at least a portion of a code included in a document of the documents.

12. The system of claim 8, wherein the particular code is stored at a server as a single data field, and wherein the particular data field value is a portion of the single data field.

13. The system of claim 8, wherein the particular code is stored at a server across a plurality of data fields, wherein the particular data field value is associated with one data field of the plurality of data fields, and wherein each remaining data field value of the remaining data field values corresponds to another data field of the plurality of data fields.

14. The system of claim 8, wherein the generation of the outputs of the model is triggered when a tab input is detected at the interface, wherein the tab input causes an input cursor to move from the input element of the plurality of input elements to another input element of the plurality of input elements.

15. A computer-program product tangibly embodied in a non-transitory machine-readable storage medium, including instructions configured to cause a data processing apparatus to perform operations including:

collecting document data stored at one or more servers, the document data representing documents that characterize resources exchanged at previous times, each document of the documents including data items representing a resource exchanged, each data item of the data items corresponding to a code comprised of an ordered sequence of a plurality of data fields, the code corresponding to each data item of the data items being used to facilitate monitoring the corresponding resource exchanged, and each data field of the ordered sequence of the plurality of data fields containing a data field value that characterizes an aspect of the corresponding resource exchanged;

training a model using the collected document data, the model having been trained by executing one or more machine-learning algorithms that train the model to generate an output in response to receiving at least one data field value of a data field of the code, and the model having been trained based, at least in part, using the data items included in the documents;

displaying an interface presenting a plurality of input elements, each input element of the plurality of input elements being configured to individually receive a data field value and to display a predicted data field value for selection by a user;

receiving an input at an input element of the plurality of input elements displayed on the interface, the input characterizing a particular aspect of a particular resource exchanged, wherein the particular resource exchanged corresponds to a particular document;

determining, based on the input characterizing the particular aspect of the particular resource exchanged, a particular data field value of a plurality of data field values of a particular code, the particular code corresponding to the particular resource exchanged corresponding to the particular document, wherein the particular code includes the plurality of data field values in a particular ordered sequence, the plurality of data field values displayable on the interface in the particular ordered sequence as a complete code for processing the particular document;

processing the input using the trained model;

in response to processing the input using the trained model, generating outputs of the model, each output of the outputs representing a prediction of a remaining data field value of the particular code, and each remaining data field value of the remaining data field values corresponding to a remaining portion of the particular code other than the particular data field value, such that the particular data field value and the remaining data field values represent the particular code; and displaying the particular data field value at the input element and the remaining data field values such that each remaining data field value of the remaining data field values is presented at a remaining input element of the plurality of input elements that is different from the input element that received the input, wherein remaining data field values and the particular data field value are displayed in the particular ordered sequence on the interface as the complete code for processing the particular document.

16. The computer-program product of claim 15, wherein displaying the predicted e remaining data field values includes automatically presenting each remaining data field value of the remaining data field values within a remaining input element of the plurality of input elements in response to receiving the input at the input element.

17. The computer-program product of claim 15, wherein the predicted remaining data field values are automatically displayed at the remaining input element using one or more type-ahead techniques.

18. The computer-program product of claim 15, wherein training the model causes a relationship between two different data field values to be detected, the detection of the relationship indicating that the two different data field values formed at least a portion of a code included in a document of the documents.

19. The computer-implemented method of claim 1, further comprising:

receiving a second input corresponding to an input element of the plurality of input elements;

processing the second input using the trained model; and in response to processing the second input using the trained model, generating one or more updated outputs of the model, each updated output of the one or more updated outputs representing a prediction of one or more updated remaining data field values of a second particular code that is different than the particular code.

* * * * *

UNITED STATES PATENT AND TRADEMARK OFFICE
CERTIFICATE OF CORRECTION

PATENT NO. : 11,238,223 B2
APPLICATION NO. : 16/570959
DATED : February 1, 2022
INVENTOR(S) : Beat Nuolf et al.

It is certified that error appears in the above-identified patent and that said Letters Patent is hereby corrected as shown below:

On the Title Page

Page 2, Column 2, Other Publications, Line 7: Delete "wat topaythe bills"," and insert -- way to pay the bills", --.

In the Specification

Column 7, Line 62: Delete "configuration Ill" and insert -- configuration 111 --.
Column 7, Line 66: Delete "that that" and insert -- that --.
Column 11, Line 41: After "analysis" please insert -- ) --.
Column 31, Line 58: After "components" please insert -- ) --.

In the Claims

Column 36, Line 49, Claim 16: Delete "e remaining" and insert -- remaining --.

Signed and Sealed this
Twenty-third Day of August, 2022

Katherine Kelly Vidal
*Director of the United States Patent and Trademark Office*